United States Patent
Yamamoto et al.

(10) Patent No.: US 6,725,530 B2
(45) Date of Patent: Apr. 27, 2004

(54) APPARATUS AND METHOD FOR TIGHTENING FIXING BAND AND CONSTANT VELOCITY UNIVERSAL JOINT APPARATUS

(75) Inventors: Tomohiko Yamamoto, Mooka (JP); Satoru Kudo, Utsunomiya (JP); Hiroshi Sato, Mooka (JP); Yasuhisa Nagayama, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/369,575

(22) Filed: Feb. 21, 2003

(65) Prior Publication Data

US 2003/0126737 A1 Jul. 10, 2003

Related U.S. Application Data

(62) Division of application No. 09/677,031, filed on Sep. 29, 2000.

(30) Foreign Application Priority Data

Sep. 30, 1999 (JP) ............................. 11-279848
May 26, 2000 (JP) ....................... 2000-157195
Jul. 18, 2000 (JP) ....................... 2000-217936

(51) Int. Cl.$^7$ ........................... B23P 21/00; B23P 11/00
(52) U.S. Cl. .............................. 29/717; 29/718; 29/516
(58) Field of Search ........................ 29/450, 451, 453, 29/510, 511, 516, 525.14, 715, 717, 718; 464/113, 124

(56) References Cited

U.S. PATENT DOCUMENTS 3,282,342 A  11/1966 Mott
4,068,499 A  1/1978  Sharp
RE30,606 E  5/1981  Sharp
4,273,209 A  6/1981  Orain
4,279,131 A  7/1981  Pringle
4,318,282 A  3/1982  Orain
4,371,356 A  2/1983  Dore (List continued on next page.)

FOREIGN PATENT DOCUMENTS

| DE | 4036280 A | 5/1991 |
| GB | 8119769 A | 6/1981 |
| GB | 8204198 A | 2/1982 |
| GB | 2218778 A | 11/1989 |
| IT | 369930 A  | 8/1939 |
| JP | 54-105634 A | 8/1979 |
| JP | 58-34710 B2 | 1/1982 |
| JP | 58-50349 A  | 3/1983 |
| JP | 58-142027 A | 8/1983 |
| JP | 63-11429 Y2 | 10/1984 |
| JP | 61-171613 A | 8/1986 |
| JP | 62-16541 Y2 | 4/1987 |
| JP | 6349526 A   | 3/1988 |
| JP | 1-75629 U   | 5/1989 |
| JP | 3224831 A   | 10/1991 |
| JP | 2598540 Y2  | 3/1995 |
| JP | 7-251336 A  | 10/1995 |

*Primary Examiner*—John C. Hong
(74) *Attorney, Agent, or Firm*—Birch, Stewart, Kolasch & Birch, LLP

(57) ABSTRACT

A fixing band-tightening apparatus comprises a holding section for gripping a shaft section at both ends in an axial direction, the holding section being provided rotatably in a circumferential direction in accordance with a driving action of a rotary driving source, a stopper section arranged in a lateral direction substantially horizontal with respect to the holding section, for positioning a projection of a fixing band in the lateral direction except for a vertical direction, and a band-tightening section for forcibly nipping the projection of the fixing band positioned by the stopper section to tighten the fixing band.

1 Claim, 39 Drawing Sheets

U.S. PATENT DOCUMENTS

| | | |
|---|---|---|
| 4,518,370 A | 5/1985 | Orain |
| 4,698,046 A | 10/1987 | Poulin |
| 4,778,026 A | 10/1988 | Uchida et al. |
| 4,829,849 A | 5/1989 | Masuda et al. |
| 4,959,521 A | 9/1990 | Maruyama et al. |
| 5,692,962 A | 12/1997 | Fukumura et al. |
| 5,951,401 A * | 9/1999 | Kita et al. ................. 464/113F |

* cited by examiner

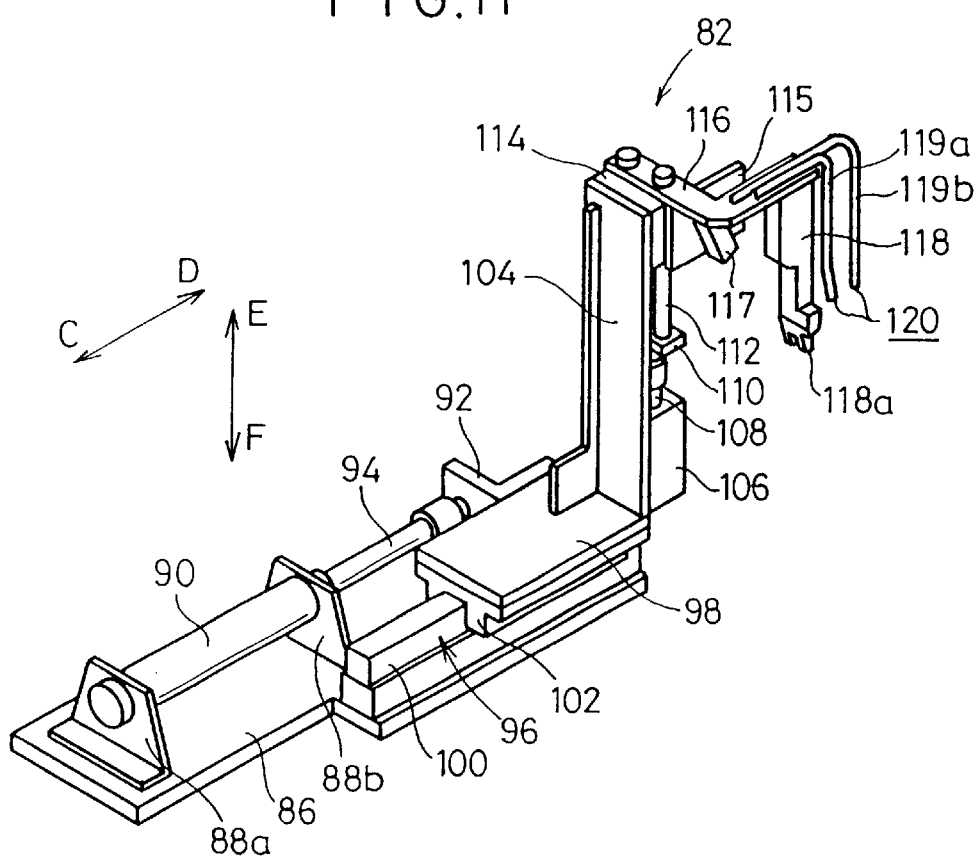
F I G. 11

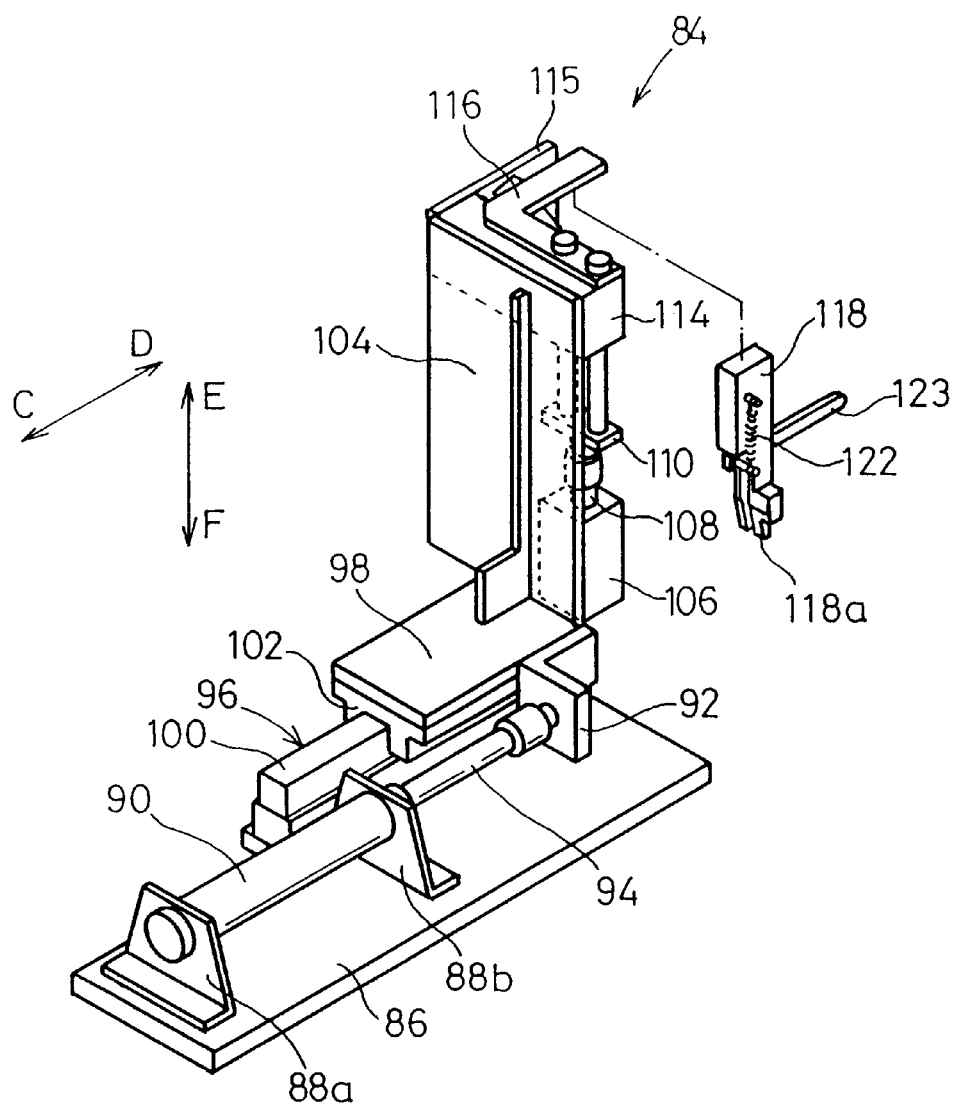
F I G. 12

F I G. 20
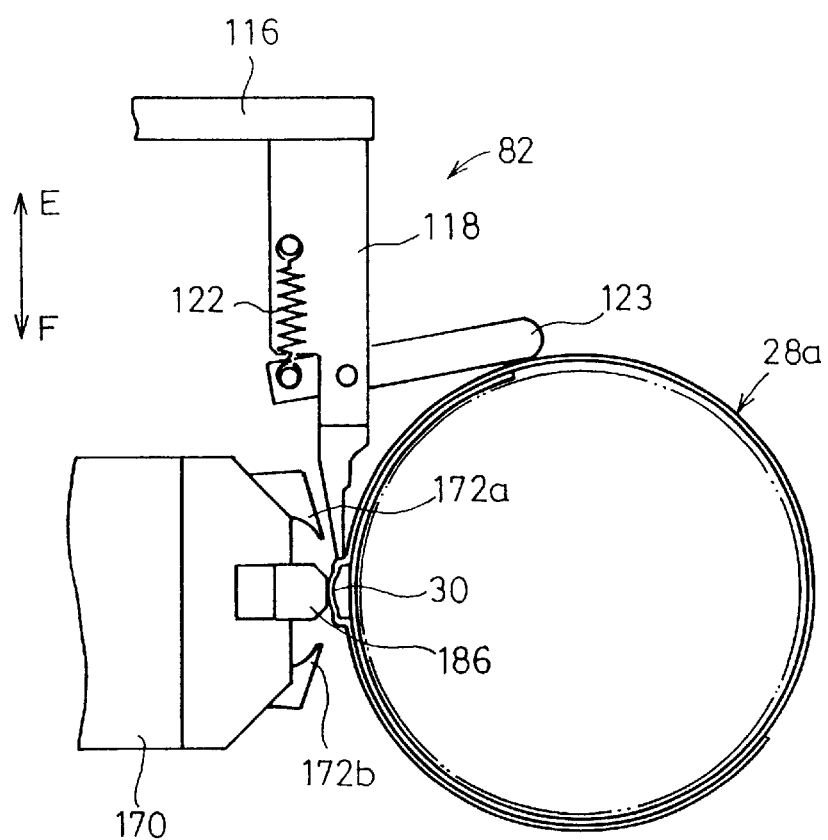

F I G. 21
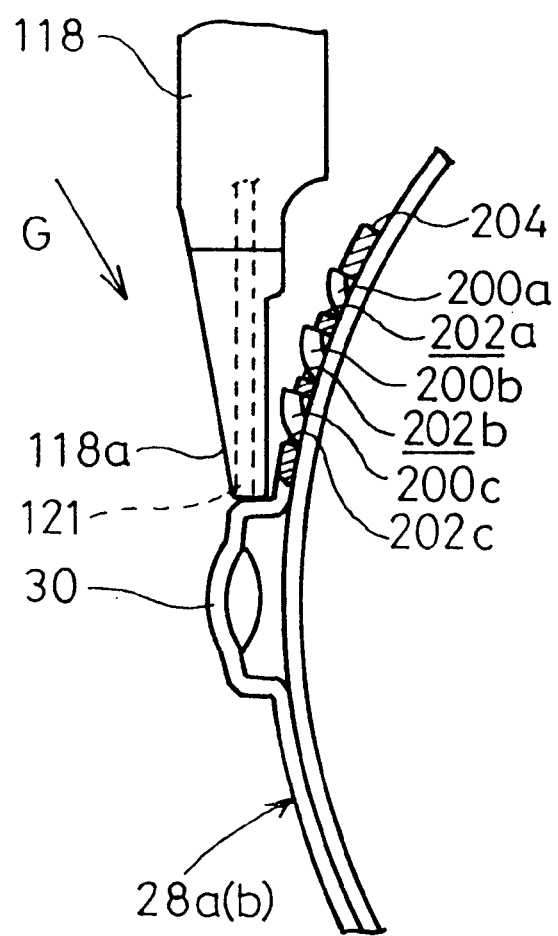

F I G. 22
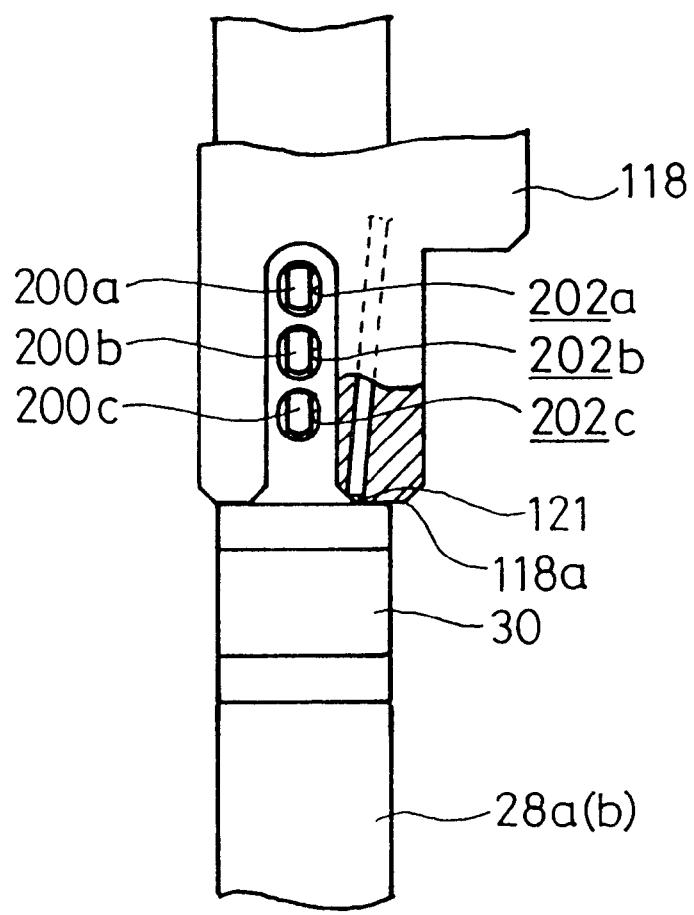

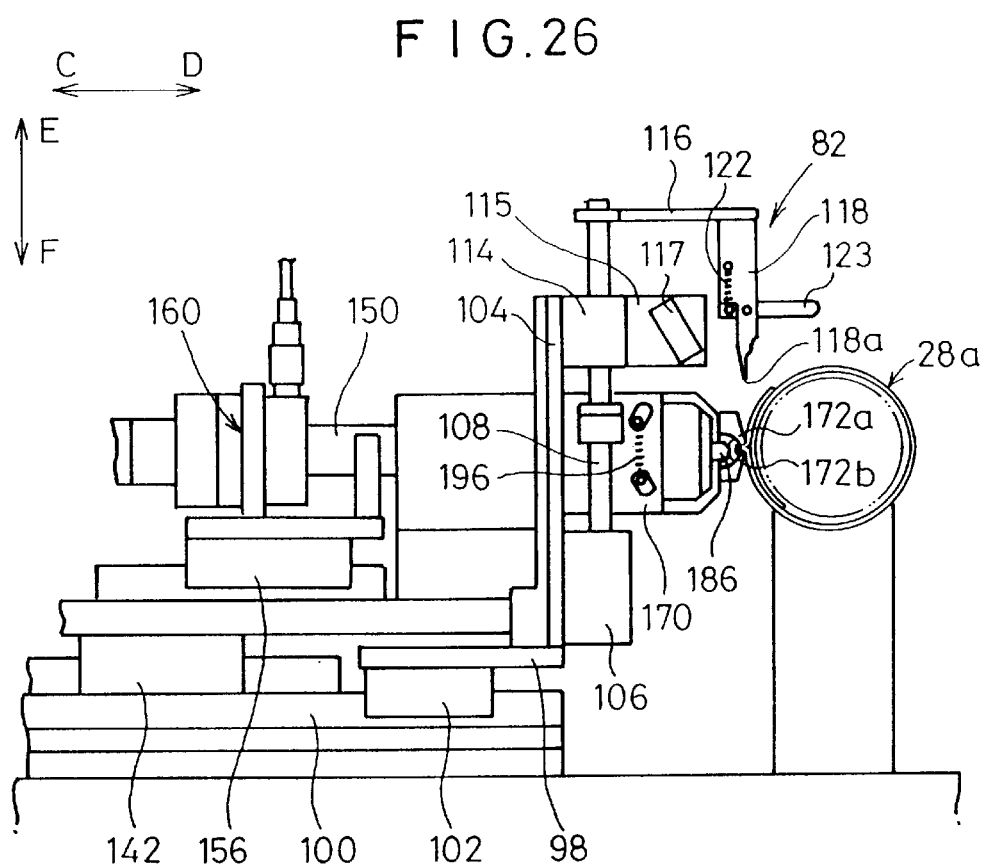
F I G. 26

APPARATUS AND METHOD FOR TIGHTENING FIXING BAND AND CONSTANT VELOCITY UNIVERSAL JOINT APPARATUS

This application is a divisional of co-pending application Ser. No. 09/677,031, filed on Sep. 29, 2000, the entire contents of which are hereby incorporated by reference and for which priority is claimed under 35 U.S.C. § 120; and this application claims priority of Application Nos. 11-279848, 2000-157195 and 2000-217936 filed in Japan on Sep. 30, 1999, May 26, 2000 and Jul. 18, 2000, respectively under 35 U.S.C. § 119.

BACKGROUND OF THE INVENTION

1. Field of the Invention

The present invention relates to an apparatus and a method for tightening a fixing band, which make it possible to tighten the fixing band to be used, for example, to fix a boot installed to a constant velocity universal joint. The present invention also relates to a constant velocity universal joint apparatus.

2. Description of the Related Art

A constant velocity universal joint has been hitherto used for a driving force-transmitting section of a vehicle such as an automobile in order to transmit the rotary force of a driving shaft to respective axles via a driven shaft. A bellows-shaped boot is installed to the constant velocity universal joint. The boot functions to ensure the liquid-tight performance for lubricating oil enclosed in an outer cup and prevent the inside of the outer cup from invasion of dust, water, and the like.

The boot comprises a bellows section which has a bellows-shaped configuration, a large diameter annular attachment section which is installed to an outer circumferential surface of the outer cup, and a small diameter annular attachment section which is installed to an outer circumferential surface of a shaft on the driven side, wherein the large diameter annular attachment section and the small diameter annular attachment section are formed integrally at both ends of the bellows section. Fixing bands for the large diameter and for the small diameter are constricted to the large diameter annular attachment section and the small diameter annular attachment section respectively.

Usually, such a boot is formed of a rubber material. However, it is difficult to respond to the recent demand, for example, for the high speed durability and the durability against temperature. Therefore, a boot, which is based on the use of a synthetic resin material in place of the rubber material, is often adopted. The boot made of resin has rigidity, and it scarcely suffers from warpage or the like as well, as compared with the boot made of rubber.

A technical concept is disclosed in Japanese Laid-Open Patent Publication No. 7-251336, in which the fixing band is automatically installed by mechanically tightening the fixing band. A band-fixing apparatus, which is disclosed in Japanese Laid-Open Patent Publication No. 7-251336, is provided with a positioning mechanism for the axial direction and a temporary positioning mechanism for the circumferential direction. A method is adopted, in which a projection of the fixing band, which is temporarily positioned at an upper portion of the boot by the temporary positioning mechanism for the circumferential direction, is forcibly nipped and deformed by a pawl mechanism to reduce the diameter of the fixing band so that the boot is fixed to a drive shaft.

That is, the band-fixing apparatus, which is disclosed in Japanese Laid-Open Patent Publication No. 7-251336, is operated such that the projection of the fixing band is sensed by a photoelectric sensor to stop the driving of a motor on the basis of an output of the photoelectric sensor. Accordingly, the position is temporarily determined in the circumferential direction so that the projection of the fixing band is disposed at the upper portion of the boot, and the projection is forcibly nipped and deformed by the aid of the pawl mechanism.

However, in the case of the band-fixing apparatus concerning the conventional technique described above, the projection of the fixing band is forcibly nipped in the state of being temporarily positioned at the upper portion of the boot. Therefore, a problem arises such that it is impossible to make application to an existing tightening apparatus for a fixing band which has been hitherto used by the present applicant.

That is, the present applicant has proposed a method for fixing a boot in which the boot made of rubber is wound with a steel belt, and an overlapped portion of the steel belt is irradiated with a laser beam so that the overlapped portion is welded and fused (see Japanese Patent Publication No. 58-34710). When the method for fixing the boot proposed by the present applicant is applied to a boot made of rubber for a tripod type constant velocity universal joint on the inboard side as shown in FIG. 27, while a boot made of resin is used for a bar field type constant velocity universal joint on the outboard side, then it is demanded that the tightening position for the fixing band for fixing the boot made of resin resides in an identical positional relationship with respect to the position for the welding and fusion effected by radiating the laser beam.

In other words, the laser beam apparatus for welding and fusing the steel belt to the boot made of rubber is arranged in the substantially horizontal direction (lateral direction) with respect to the constant velocity universal joint on the inboard side. Therefore, in view of the layout at the installation place, if the technical concept disclosed in Japanese Laid-Open Patent Publication No. 7-251336 is applied, an inconvenience arises such that the equipment investment is excessive, and the production cost is expensive.

If the technical concept disclosed in Japanese Laid-Open Patent Publication No. 7-251336 is applied, it is necessary to change the existing production line. Also in this viewpoint, the excessive equipment investment is required.

When the boot made of resin is fixed by tightening the fixing band from a position disposed in the substantially horizontal direction (lateral direction) with respect to the constant velocity universal joint on the outboard side, it is demanded that the projection of the fixing band is positioned at a position other than the upper and lower portions of the boot, for example, at a position disposed in the substantially horizontal direction (lateral direction) to tighten the fixing band.

The boot made of resin is produced by means of the blow molding or the injection molding. A plurality of boots made of resin are accommodated and transported in a bucket after the production. For example, a hollow portion of a boot made of resin, which is stacked on the lower side during the transport, is crushed, and a bellows section of the boot made of resin is deformed in some cases, probably because of the following reason. That is, no sufficient cooling time is consumed during the molding process for the resin for the boot made of resin. Therefore, when the plurality of boots made of resin are stacked, then any load is applied to the bellows section, and the bellows section is deformed.

If the fixing band is installed to the boot made of resin deformed as described above by using the band-fixing apparatus concerning the conventional technique described above, the following inconvenience arises as shown in FIG. 43. That is, when the projection of the fixing band is forcibly nipped, the pawl mechanism makes approach to contact with the deformed portion of the bellows section of the boot made of resin. As a result, the bellows section is damaged. When the pawl mechanism contacts with the bellows section, the back and forth movement of the pawl mechanism is obstructed. It is feared that any trouble occurs, for example, such that the operation of the band-fixing apparatus is stopped.

When the large diameter annular attachment section of the boot made of resin is installed to the outer circumferential surface of an outer cup together with the loosely fitted fixing band having a large diameter, and the fixing band having the large diameter is tightened, if the large diameter annular attachment section of the boot made of resin is installed in a state of being deviated from a normal position with respect to the outer circumferential surface of the outer cup, then the following inconvenience arises. That is, the large diameter annular attachment section is fixed by the fixing band in a state in which it is subjected to any positional discrepancy. Similarly, another inconvenience also arises such that the small diameter annular attachment section is fixed by the fixing band in a state in which it is subjected to any positional discrepancy.

The technical concept, in which the projection is provided at a portion at which the fixing band for the boot for the constant velocity universal joint is installed, is disclosed, for example, in Japanese Laid-Open Utility Model Publication No. 1-75629, Japanese Utility Model Publication No. 63-11429, Japanese Utility Model Publication No. 62-16541, and Japanese Utility Model No. 2598540.

In the technical concept disclosed in Japanese Laid-Open Utility Model Publication No. 1-75629, a projection is provided in order to avoid the occurrence of crack at a portion at which a band is installed. In the technical concept disclosed in Japanese Utility Model Publication No. 63-11429, a projection is provided in order to improve the installation performance by giving the flexibility to a boot made of hard resin. In the technical concept disclosed in Japanese Utility Model Publication No. 62-16541, a projection tab is provided in order to improve the strength and the sealing performance. In the technical concept disclosed in Japanese Utility Model No. 2598540, a small projecting strip is provided in order to facilitate the assembling performance by decreasing the rigidity of the fixed end.

As described above, the technical concepts disclosed in these patent documents are completely different from the invention of this application in problem to be solved. Objects, constructions, functions, and effects of them are conspicuously different from those of the invention of this application.

That is, in the technical concepts disclosed in the preceding techniques, the projection is provided in order to improve the tightening force of the fixing band, or the projection is provided, for example, for the purpose of improving the installation performance, improving the sealing performance, or facilitating the assembling performance. On the other hand, the invention of this application is different from the above in the following points. That is, when a fixing band is constricted by using a fixing band-tightening apparatus, the frictional coefficient between a boot made of resin and the fixing band is increased in order to avoid the loose rotation of the fixing band with respect to the boot made of resin. The projection of the fixing band, which may be rotated integrally with the boot made of resin, is forcibly nipped, for example, in a state of being positioned at a position disposed in a substantially horizontal direction. By doing so, the fixing band is tightened and constricted.

In other words, it is enough that a frictional coefficient-increasing mechanism, which is one of the features of the invention of this application, persistently exhibits the function sufficient to integrally rotate the fixing band when the fixing band is constricted by using the fixing band-tightening apparatus. The frictional coefficient-increasing mechanism does not function to increase the tightening force for the fixing band. In this viewpoint, the invention of this application is clearly different from the technical concepts disclosed in the preceding techniques.

SUMMARY OF THE INVENTION

A general object of the present invention is to provide a constant velocity universal joint apparatus and an apparatus and a method for tightening a fixing band, which make it possible to harmonize the layout with an existing fixing band-tightening apparatus by tightening a projection of the fixing band in a state of being positioned at a position except for an upper portion and a lower portion of a boot so that the versatility is improved.

A principal object of the present invention is to provide a fixing band-tightening apparatus which makes it possible to smoothly install a fixing band without making contact with a bellows section even when a boot made of resin is deformed.

Another object of the present invention is to provide a fixing band-tightening apparatus which makes it possible to reliably install large diameter and small diameter annular attachment sections of a boot made of resin to predetermined positions subjected to positioning.

Still another object of the present invention is to provide a fixing band-tightening method for a boot for a constant velocity universal joint, which is preferably used for the fixing band-tightening apparatus described above and which makes it possible to integrally rotate a fixing band and the boot made of resin in a reliable manner by increasing the coefficient of friction when the fixing band is tightened and fixed by using the fixing band-tightening apparatus.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11 shows a perspective view illustrating a first stopper mechanism for constructing a stopper section;

FIG. 12 shows a perspective view illustrating a second stopper mechanism for constructing the stopper section;

FIG. 20 illustrates an operation depicting a state in which the stopper block is moved downwardly to make abutment against the projection after detecting the projection of the fixing band by using the sensor;

FIG. 21 shows, with partial cross section, a side view in a state in which the first end of the stopper block abuts against the projection;

FIG. 22 shows, with partial cutout, a front view in a state in which the first end of the stopper block abuts against the projection;

FIG. 26 shows an operation illustrating a state in which the projection of the fixing band is forcibly nipped by the pawls;

DESCRIPTION OF THE PREFERRED EMBODIMENTS

Figure 1:
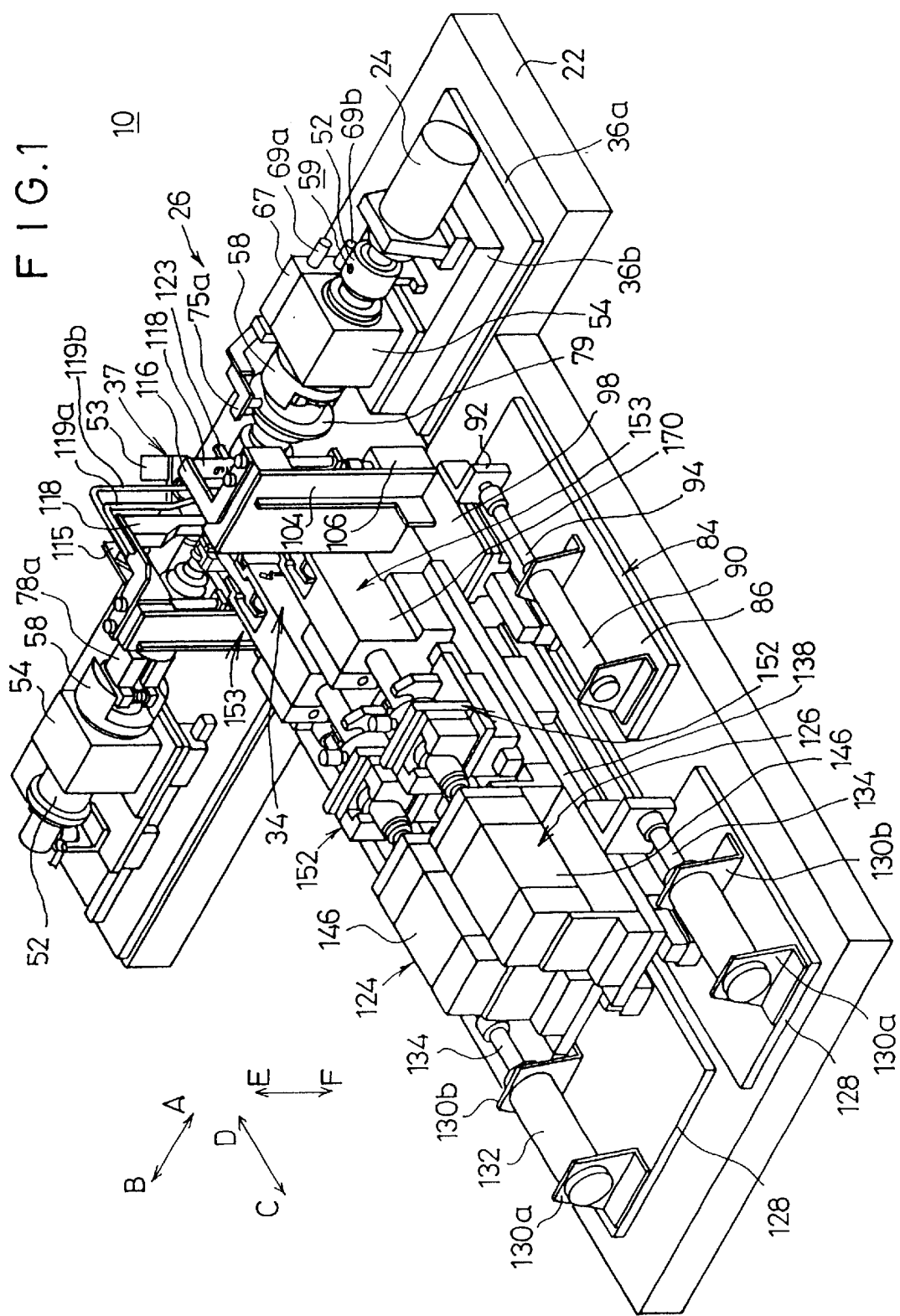
FIG. 1 shows a perspective view illustrating a fixing band-tightening apparatus according to an embodiment of the present invention.
Figure 2:
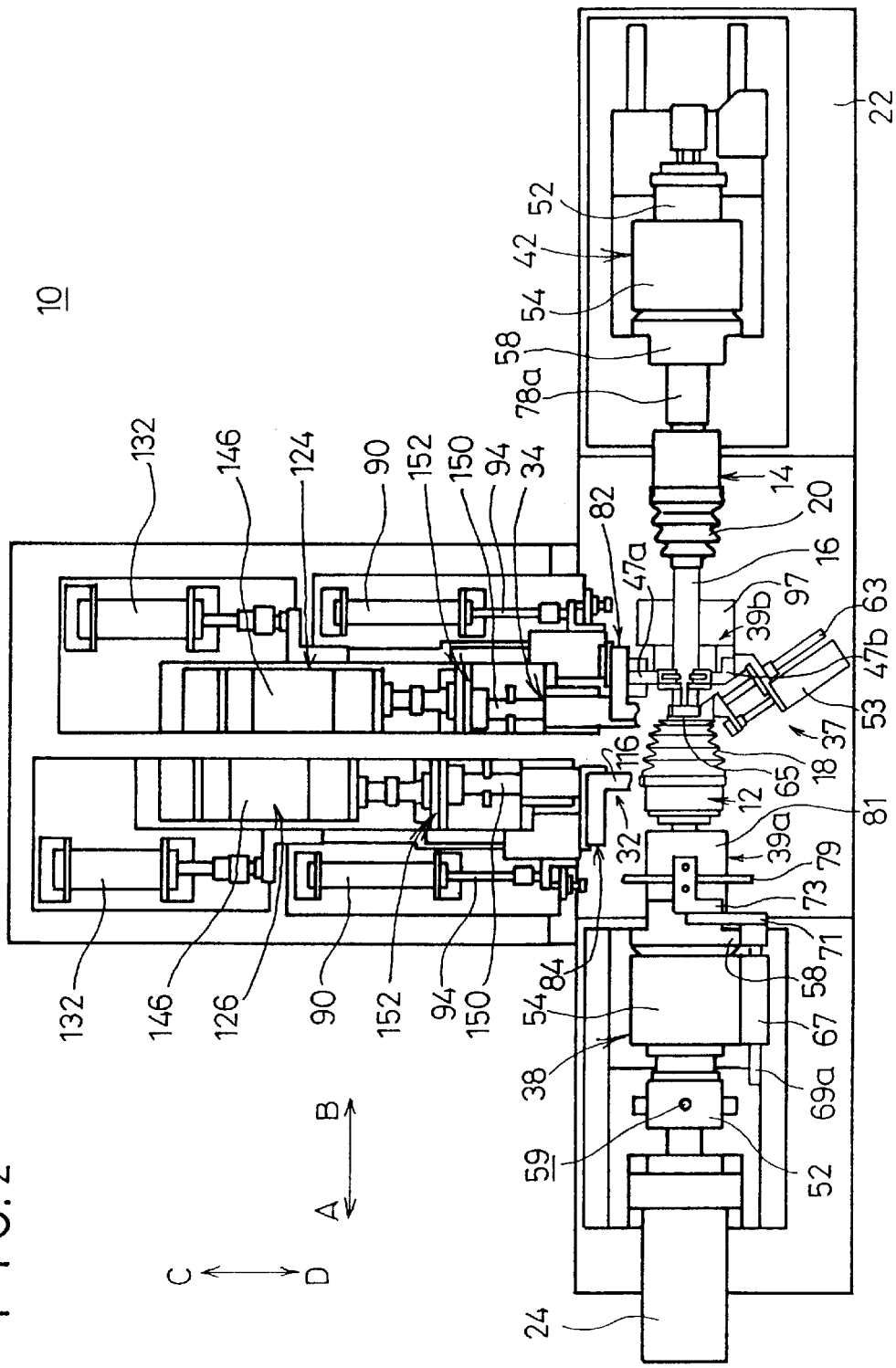
FIG. 2 shows a plan view illustrating the fixing band-tightening apparatus.

A fixing band-tightening apparatus 10 according to an embodiment of the present invention is shown in FIGS. 1 and 2.

A drive shaft 16 is used as a workpiece, to which a bar field type constant velocity universal joint 12 is connected to one end, and a tripod type constant velocity universal joint 14 is connected to the other end. A boot 18 made of resin is installed to the bar field type constant velocity universal joint 12, and a boot 20 made of rubber is installed to the tripod type constant velocity universal joint 14 (see FIG. 27).

The fixing band-tightening apparatus 10 is arranged on a base 22 having a substantially T-shaped configuration. The fixing band-tightening apparatus 10 comprises a holding section 26 for rotatably holding the workpiece in accordance with the driving action of a rotary driving source 24; a stopper section 32 arranged in a lateral direction substantially horizontal with respect to the holding section 26, for positioning a projection 30 of each of fixing bands 28a, 28b in a substantially horizontal state; and a band-tightening section 34 for forcibly nipping the projection 30 of each of the fixing bands 28a, 28b positioned by the stopper section 32 to tighten the fixing bands 28a, 28b.

Figure 3:
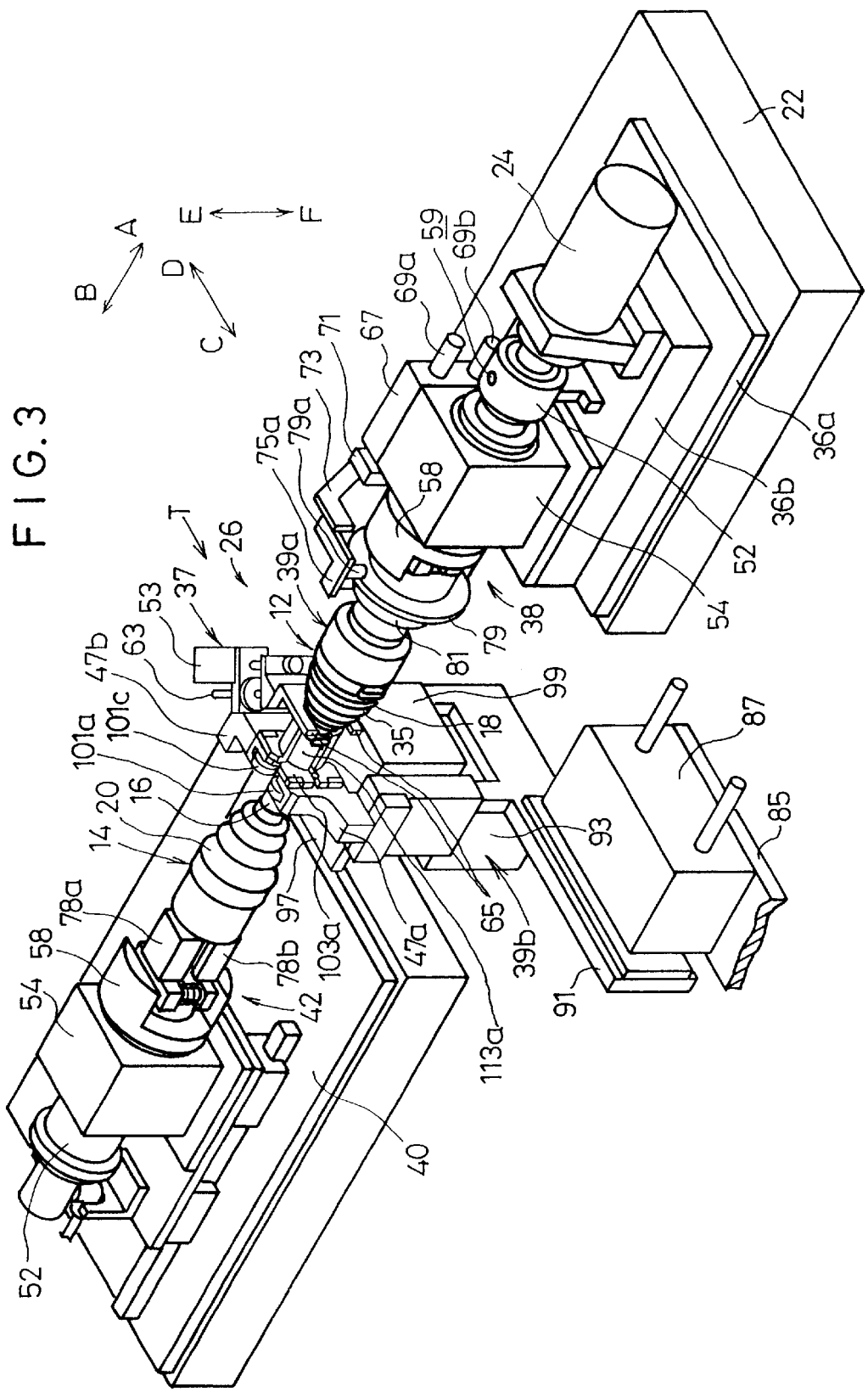
FIG. 3 shows a perspective view illustrating a holding section for constructing the fixing band-tightening apparatus.

As shown in FIG. 3, the holding section 26 comprises a first holding mechanism 38 fixed on first plates 36a, 36b, for holding a shaft section of the bar field type constant velocity universal joint 12; a second holding mechanism 42 separated by a predetermined distance from the first holding mechanism 38, for holding a shaft section of the tripod type constant velocity universal joint 14; a bellows section-pressing mechanism 37 (see FIG. 6) provided on the side of the first holding mechanism 38, for pressing a deformed portion of a bellows section 35 of the boot 18 made of resin; and an end-positioning mechanism 39 provided on the side of the first holding mechanism 38, for positioning each of a large diameter annular attachment section and a small diameter annular attachment section of the boot 18 made of resin at a predetermined position.

The end-positioning mechanism 39 comprises a large diameter side end-positioning mechanism 39a for positioning the large diameter annular attachment section of the boot 18 made of resin at the predetermined position on the outer circumferential surface of a cup section 83, and a small diameter side end-positioning mechanism 39b for positioning the small diameter annular attachment section of the boot 18 made of resin at the predetermined position on the outer circumferential surface of the drive shaft 16.

Figure 4:
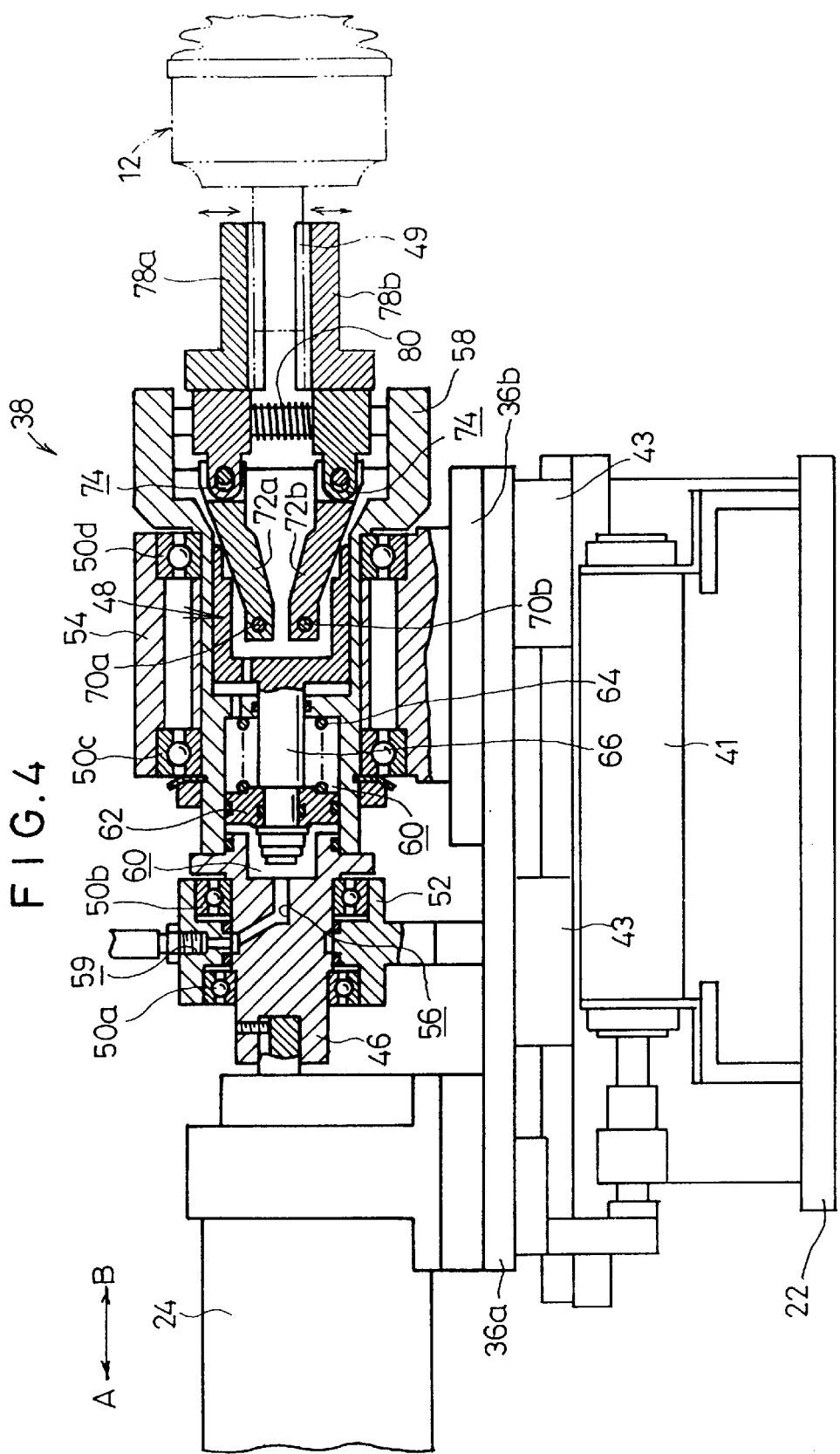
FIG. 4 shows a longitudinal sectional view illustrating a first holding mechanism for constructing the holding section.
Figure 5:
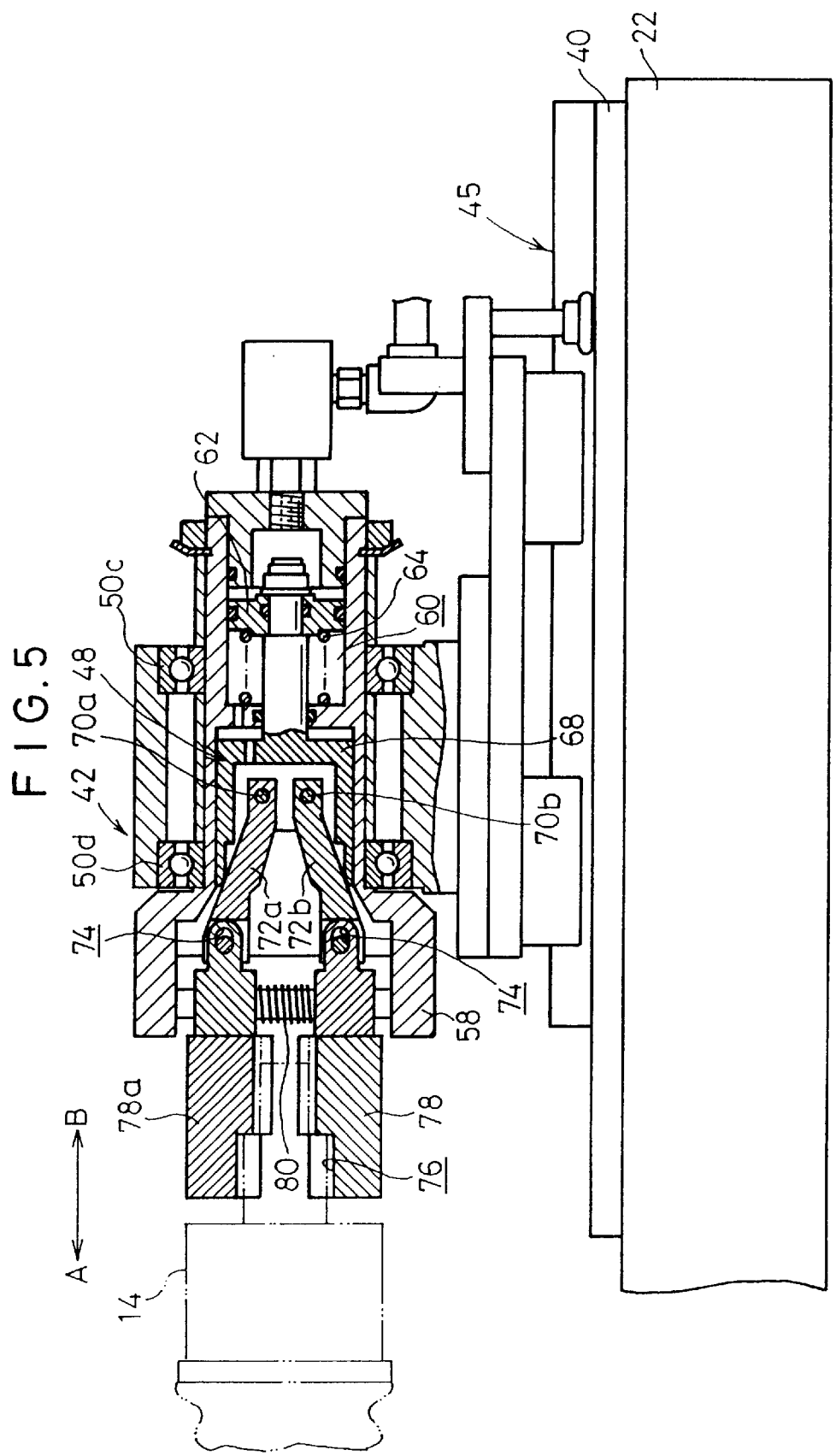
FIG. 5 shows a longitudinal sectional view illustrating a second holding mechanism for constructing the holding section.

As shown in FIG. 4, the first holding mechanism 38 is provided displaceably integrally with the first plate 36a in the direction of the arrow A or B by the aid of a linear guide 43 in accordance with the driving action of a cylinder 41. As shown in FIG. 5, the second holding mechanism 42 is provided displaceably in the direction of the arrow A or B by the aid of a linear guide 45 installed on the second plate 40.

The first holding mechanism 38 and the second holding mechanism 42 are arranged coaxially and mutually opposingly, and they are constructed in substantially the same manner except for the bellows section-pressing mechanism 37 and the end-positioning mechanism 39. Therefore, detailed explanation will be made for only the first holding mechanism 38. Constitutive components of the second holding mechanism 42 corresponding to those of the first holding mechanism 38 are designated by the same reference numerals, detailed explanation of which will be omitted.

As shown in FIG. 4, the first holding mechanism 38 has a chuck mechanism 48 which is connected to the drive shaft of the rotary driving source 24 via a coupling member 46. The coupling member 46 and the chuck mechanism 48 are rotatably supported in a first holder 52 and in a second holder 54 respectively by the aid of a plurality of bearing members 50a to 50d. The first holder 52 is provided with a pressure fluid supply port 59 for supplying a pressure fluid via a communication passage 56 communicating with the chuck mechanism 48.

The chuck mechanism 48 includes a cylinder tube 58 which is connected to the coupling member 46 and which is rotatably supported in the second holder 54, a piston 62 which is provided slidably along a cylinder chamber 60 communicating with the communication passage 56, a spring member 64 which urges the piston 62 toward the direction of the arrow A, and a cup member 68 which is connected to the piston 62 via a shaft 66 for making displacement integrally with the piston 62.

The chuck mechanism 48 further includes a pair of arms 72a, 72b which are provided with their first ends capable of making approach or separation with support points of a set of pins 70a, 70b by making engagement with an opening of the cup member 68, and a pair of pinching blocks 78a, 78b which are swingably attached via long holes 74 to first ends of the pair of arms 72a, 72b and which are formed with a recess 76 for clamping the shaft section of the outer cup for constructing the constant velocity universal joint 12. A spring member 80, which is used to urge the pair of pinching blocks 78a, 78b in directions to make separation from each other, is installed between the pair of pinching blocks 78a, 78b.

In this arrangement, the piston 62 and the cup member 68 are displaced in an integrated manner in the direction of the arrow B against the resilient force of the spring member 64 in accordance with the action of the pressure fluid introduced from the pressure fluid supply port 59 via the communication passage 56 into the cylinder chamber 60. During this process, the pair of arms 72a, 72b are engaged with the opening of the cup member 68. In accordance with the engaging action, the first ends of the pair of arms 72a, 72b are displaced in the directions to make approach to one another by using the support points of the pins 70a, 70b. As a result, the pair of pinching blocks 78a, 78b, which are swingably attached to the first ends of the pair of arms 72a, 72b, make approach to one another against the resilient force of the spring member 80. Thus, the shaft section 49 of the constant velocity universal joint 12 is held by the aid of the recess 76.

When the shaft section 49 is released from the holding state to detach the constant velocity universal joint 12, the pressure fluid supply port 59 is allowed to make communication with the atmospheric air in accordance with the switching action of an unillustrated changeover valve to decrease the pressure in the cylinder chamber 60. Accordingly, the piston 62 and the cup member 68 are displaced in the direction (direction of the arrow A) opposite to the above in accordance with the resilient force of the spring member 64. Therefore, the pair of arms 72a, 72b are released from the pressurizing force having been applied by the opening of the cup member 68. The pair of pinching blocks 78a, 78b are displaced in directions to make separation from each other by the aid of the resilient force of the spring member 80.

Figure 7:
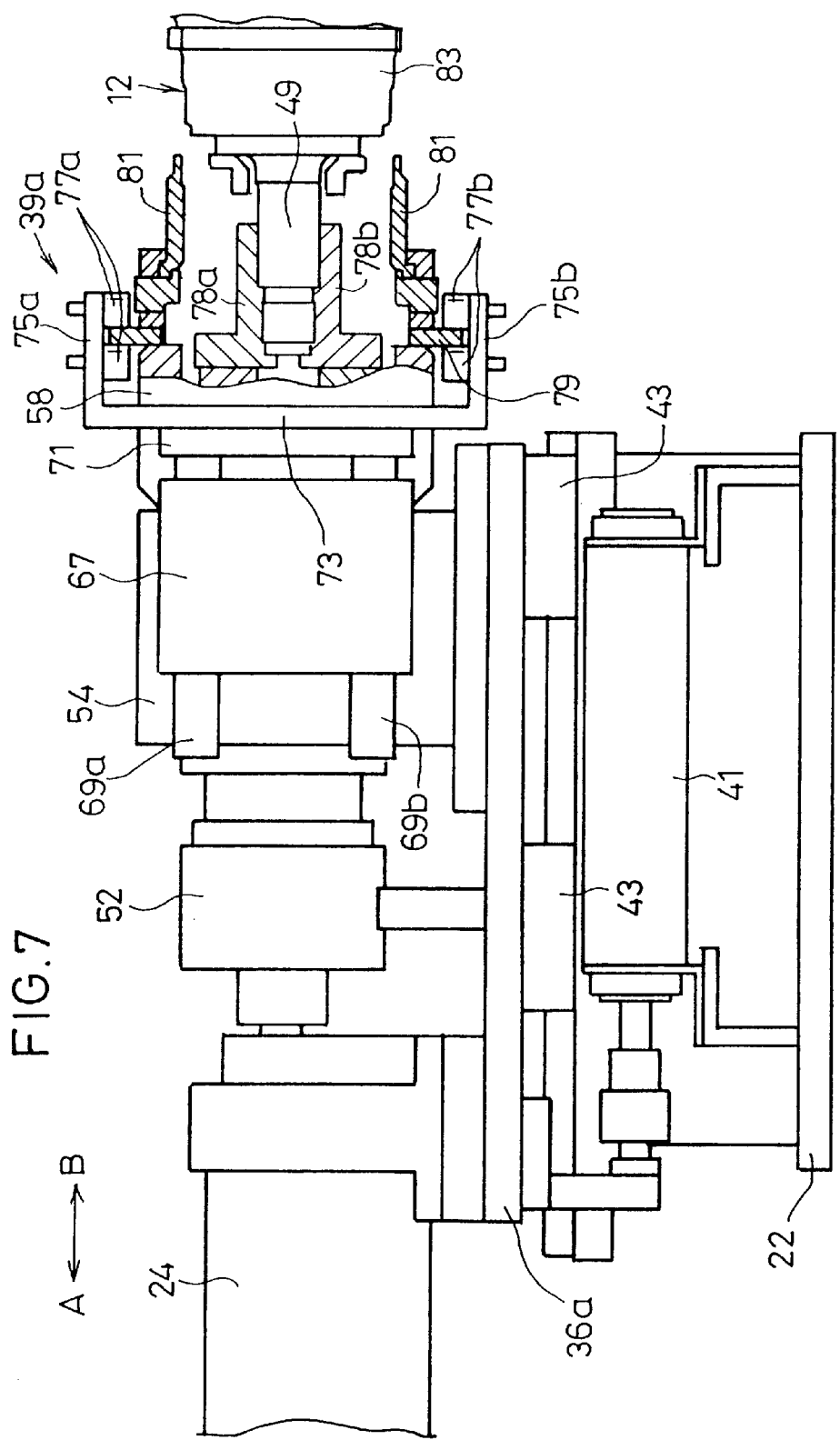
FIG. 7 shows, with partial cutout, a front view illustrating a large diameter side end-positioning mechanism for constructing the holding section.

As shown in FIG. 7, the large diameter side end-positioning mechanism 39a comprises a cylinder 67 which is fixed to one side surface of the second holder 54, a pair of piston rods 69a, 69b which are displaceable in the substantially horizontal direction in accordance with the driving action of the cylinder 67, a displacement member 73 which is connected to first ends of the piston rods 69a, 69b via a plate 71, a pair of rollers 77a, 77b which are rotatably supported by arms 75a, 75b of the displacement member 73, and a substantially cylindrical collar 81 to which an annular member 79 for being engaged with the pair of rollers 77a, 77b is externally fitted.

The collar 81 is formed to have a cylindrical configuration having a hole with substantially the same diameter as the diameter of the cup section 83 of the constant velocity universal joint 12, and it is provided rotatably about the center of rotation of the axis of shaft section 49 of the constant velocity universal joint 12 in accordance with the engaging action of the annular member 79 with the pair of rollers 77a, 77b.

A pair of guide rails (not shown), which are opposed to one another and which extend in the axial direction, are installed to the outer circumferential surface of the cylinder tube 58 for surrounding the pair of pinching blocks 78a, 78b. The collar 81 is provided displaceably in the direction of the arrow A or B in accordance with the guiding action of the unillustrated guide rails.

Figure 8:
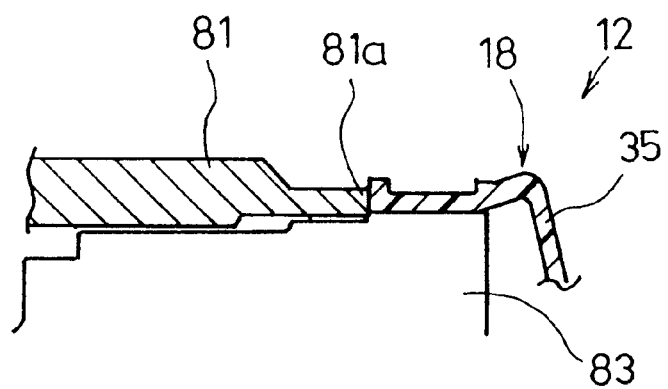
FIG. 8 shows, with partial omission, a vertical sectional view illustrating a state in which a collar for constructing the large diameter side end-positioning mechanism abuts against a large diameter annular attachment section of a boot made of resin, and the collar is positioned.

Therefore, the collar 81 is displaced in the direction of the arrow B in accordance with the driving action of the cylinder 67. As shown in FIG. 8, the collar 81 functions to surround the outer circumferential surface of the cup section 83 so that the first end 81a of the collar 81 abuts against the large diameter annular attachment section of the boot 18 made of resin to position the large diameter annular attachment section at a predetermined position on the outer circumferential surface of the cup section 83. The fixing band 28a is tightened by rotating the constant velocity universal joint 12 while maintaining the state in which the large diameter annular attachment section is positioned by the collar 81.

As shown in FIGS. 2, 3, 6, 9, and 10, the small diameter side end-positioning mechanism 39b has a first cylinder 87 which is fixedly provided on the plate 85, a first connecting plate 91 which is connected to a piston rod 89 of the first cylinder 87, a second cylinder 93 which is connected to the first connecting plate 91 and which is provided displaceably in the substantially horizontal direction (direction of the arrow A or B) in accordance with the driving action of the first cylinder 87, a second connecting plate 97 which is connected to a piston rod 95 of the second cylinder 93, and a chuck member 99 which is connected to the second connecting plate 97 and which is provided displaceably in the substantially vertical direction (direction of the arrow E or F) in accordance with the driving action of the second cylinder 93.

Figure 10:
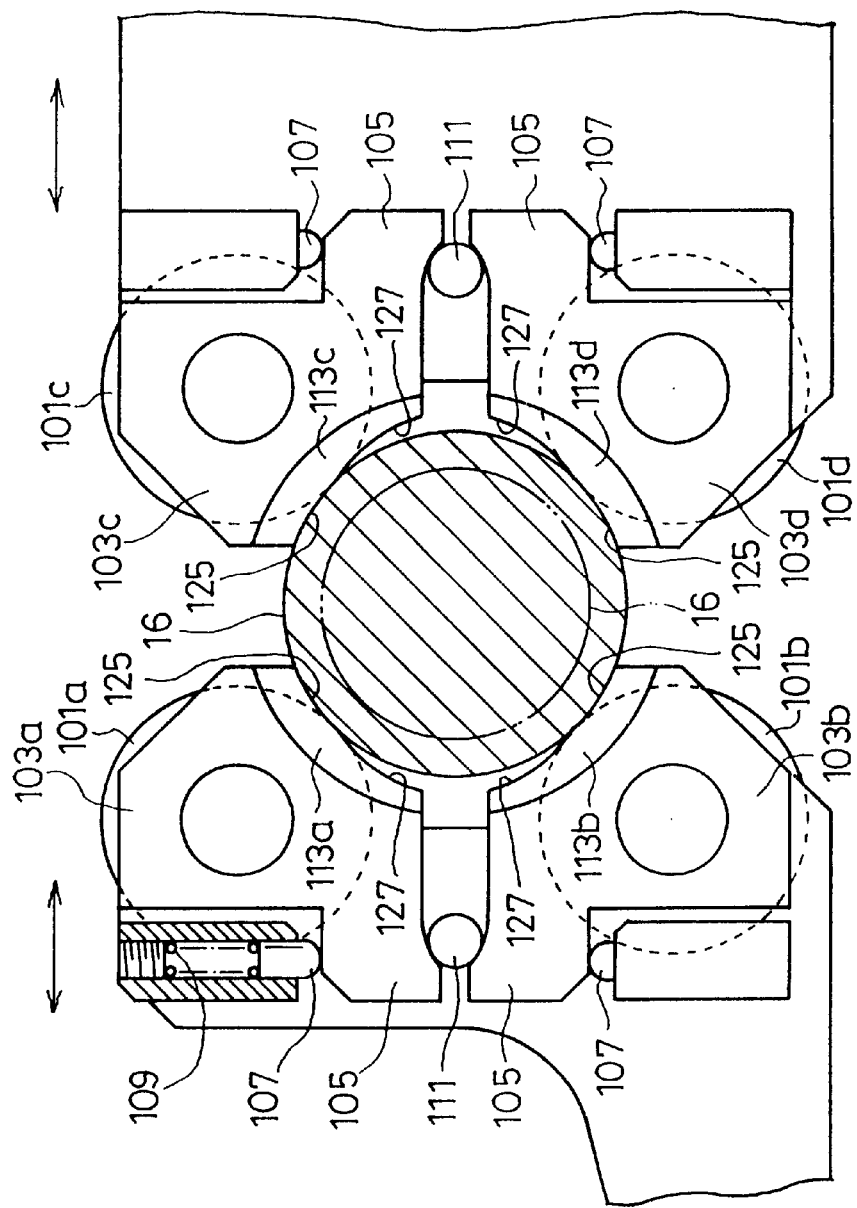
FIG. 10 shows a vertical sectional view taken along a line X—X shown in FIG. 9.

As shown in FIG. 10, the chuck member 99 is provided with a pair of support members 47a, 47b which make mutually approach or separation in the directions of the arrows in accordance with the driving action of the chuck member 99. The pair of support members 47a, 47b are provided with four support blocks 103a to 103d for rotatably supporting the outer circumferential surface of the drive shaft 16 by the aid of rollers 101a to 101d which are rotatably attached thereto. Pin members 107 abut against projections 105 of the support blocks 103a to 103d. The pin member 107 is provided so that a first end of a spring member 109 installed in a hole is fastened thereto. The spring members 109 are provided to absorb the shock applied to the support blocks 103a to 103d. Reference numeral 111 indicates stoppers for fastening the support blocks 103a to 103d.

The support block 103a to 103d is formed with a circular arc-shaped projection 113a to 113d which is formed by being bent in a circular arc-shaped vertical cross section and which protrudes by a predetermined length in the axial direction of the drive shaft 16. A first circular arc surface 125 and a second circular arc surface 127, which have mutually different radiuses of curvature, are formed on the inner circumferential surface of the circular arc-shaped projection 113a to 113d in order to respond to various drive shafts 16 having different diameters.

For example, the following arrangement is adopted. That is, when the diameter of the drive shaft 16 is maximum, the first circular arc surfaces 125 of the support blocks 103a to 103d are engaged with the outer circumferential surface of the drive shaft 16 (see solid line in FIG. 10). When the diameter of the drive shaft 16 is minimum (see two-dot chain line in FIG. 10), then the support blocks 103a to 103d make approach to one another, and the second circular arc surfaces 127 of the support blocks 103a to 103d are engaged with the outer circumferential surface of the drive shaft 16.

Figure 9:
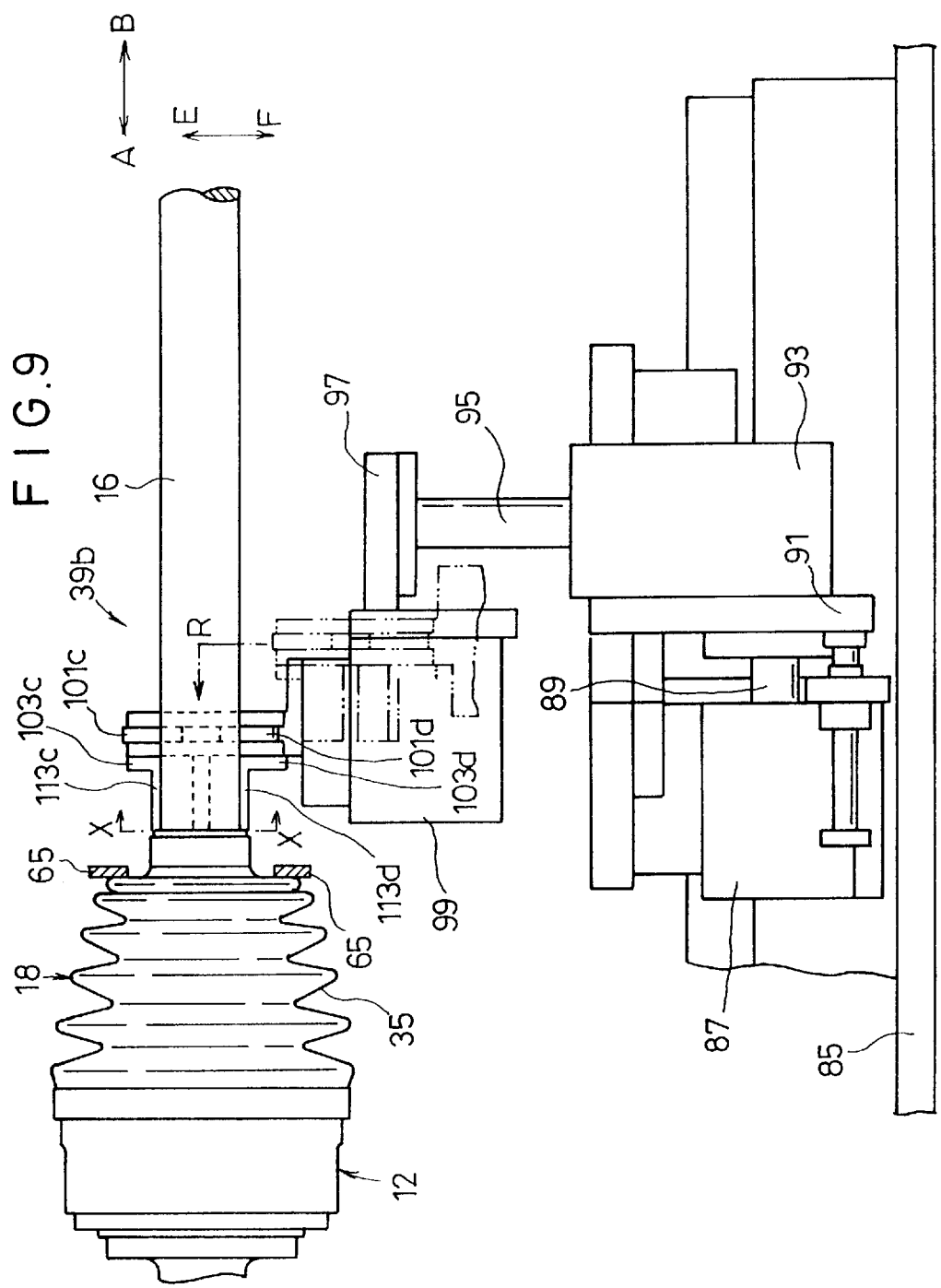
FIG. 9 shows a view as viewed in a direction of an arrow T shown in FIG. 3, illustrating a small diameter side end-positioning mechanism.

Therefore, the support blocks 103a to 103d make bending displacement along the arrow R shown in FIG. 9 in accordance with the driving action of the first and second cylinders 87, 93. When the chuck member 99 is driven to allow the pair of support members 47a, 47b to make approach to one another, the drive shaft 16 is rotatably supported by the rollers 101a to 101d of the four circular arc-shaped projections 113a to 113d. In this arrangement, the small diameter annular attachment section of the boot 18 made of resin is regulated by the ends of the four circular arc-shaped projections 113a to 113d. Accordingly, the small diameter annular attachment section is positioned at a predetermined position of the drive shaft 16 (see FIGS. 6 and 9).

Figure 6:
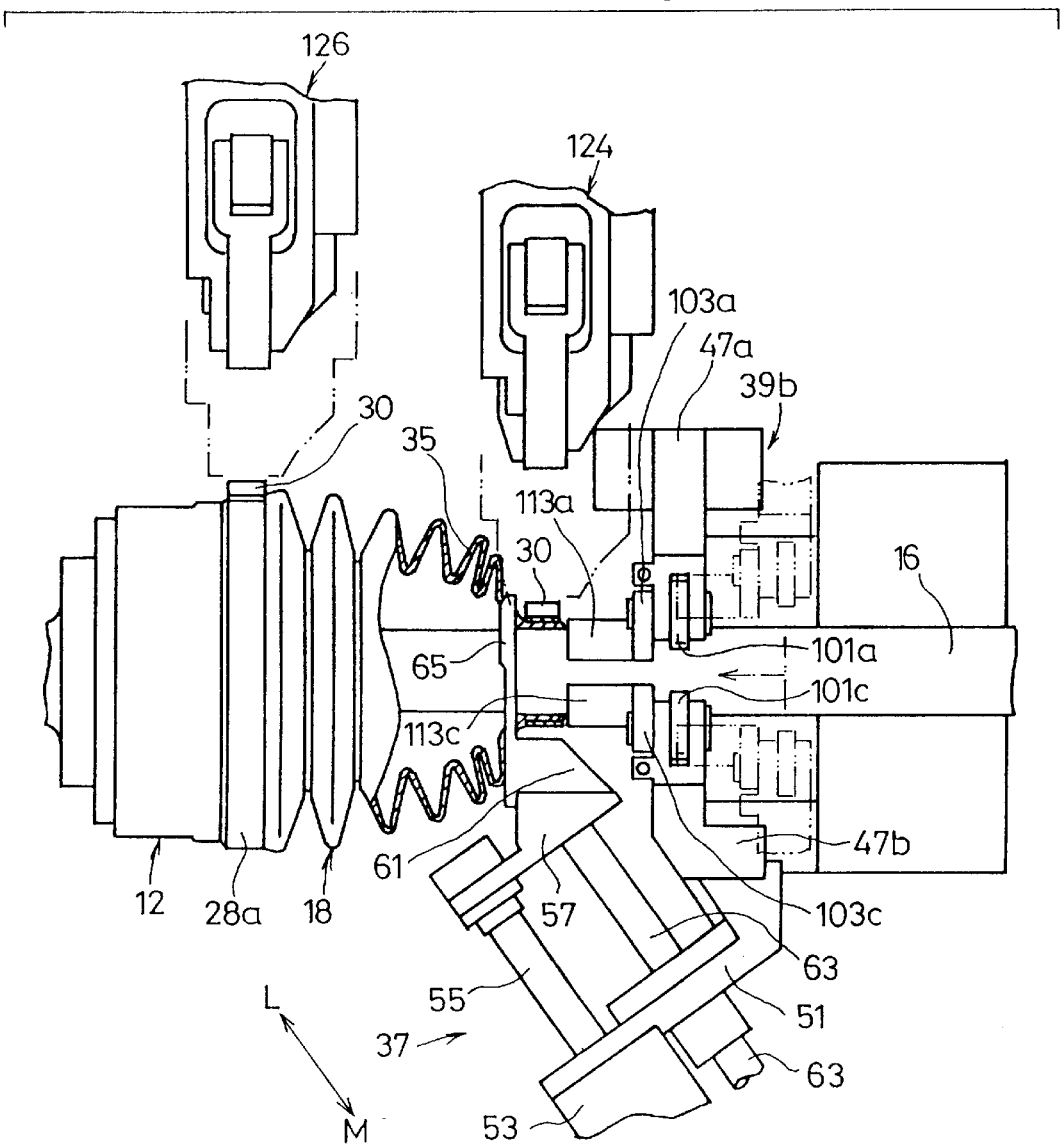
FIG. 6 shows a plan view illustrating a bellows section-pressing mechanism for constructing the holding section.

As shown in FIGS. 2, 3, and 6, the bellows section-pressing mechanism 37 has a cylinder 53 which is connected to the first support member 47b by the aid of an attachment member 51 and which is arranged to be inclined by a predetermined angle with respect to the axis of the drive shaft 16 as viewed in a plan view, a pressing plate 61 which is provided movably back and force in the direction of the arrow L or M in accordance with the driving action of the cylinder 53 by the aid of a connecting member 57 installed to the first end of a piston rod 55, and a guide rod 63 which has its first end connected to the connecting member 57 and which has its second end provided insertably with respect to a hole of the attachment member 51.

In this arrangement, the bellows section-pressing mechanism 37 is provided to make displacement integrally with the first support member 47b in the substantially vertical direction and in the substantially horizontal direction in accordance with the driving action of the first and second cylinders 87, 93.

The pressing plate 61 is formed in a bent manner to have a substantially L-shaped cross section. A flat surface section 65, which abuts against the bellows section 35 on the side of the small diameter annular attachment section of the boot 18 made of resin, is formed to have a substantially U-shaped configuration having a hole (not shown) larger than the small diameter annular attachment section (see FIG. 3). The hole of the flat surface section 65 is not limited to the substantially U-shaped configuration. For example, the hole may be formed to have a substantially V-shaped configuration.

The stopper section 32 comprises a first stopper mechanism 82 (see FIG. 11) for positioning the projection 30 of the fixing band 28b to be installed to the small diameter annular attachment section of the boot 18 made of resin, and a second stopper mechanism 84 (see FIG. 12) for positioning the projection 30 of the fixing band 28a to be installed to the large diameter annular attachment section of the boot 18 made of resin.

As shown in FIG. 11, the first stopper mechanism 82 comprises a third plate 86 which is fixedly provided on the base 22, a first cylinder 90 which is fixed on the third plate 86 by the aid of a pair of fixtures 88a, 88b, and a fourth plate 98 which is connected to a first end of a piston rod 94 of the first cylinder 90 via an L-shaped block 92 and which is provided displaceably linearly in accordance with the guiding action of a linear guide 96. The linear guide 96 comprises a lengthy guide rail 100, and a guide block 102 which makes sliding displacement along the guide rail 100.

The first stopper mechanism 82 has a fifth plate 104 which is connected substantially perpendicularly to a first end of the fourth plate 98, a second cylinder 106 which is fixedly provided on a side surface portion of the fifth plate 104, a pair of substantially parallel shafts 112 which are connected to a first end of a piston rod 108 of the second cylinder 106 via a connecting member 110, a block member 114 which is fixed to the fifth plate 104 and which guides the pair of shafts 112 by the aid of unillustrated guide holes for inserting the pair of shafts 112 therethrough, and a substantially L-shaped bent member 116 which is connected to first ends of the pair of shafts 112 by the aid of screw members.

The bent member 116 is provided with a stopper block 118 which hangs substantially in the vertical direction. A first end 118a of the stopper block 118 functions to make abutment against the projection 30 of the fixing band 28b so that the projection 30 is positioned in a substantially horizontal state as described later on.

One or a plurality of tubes 119a, 119b, which are connected to an unillustrated air supply source, are retained by the bent member 116. When the boot 18 made of resin and the fixing band 28b are rotated in an integrated manner in accordance with the driving action of the rotary driving source 24, the fixing band 28b installed to the small diameter annular attachment section of the boot 18 made of resin may be rotated in unison with the boot 18 made of resin. When the air is discharged from blow ports 120 of the tubes 119a, 119b toward the rotating fixing band 28b, the fixing band 28b to be installed to the small diameter annular attachment section can be prevented from the co-rotation.

In this arrangement, the stopper block 118 and the tubes 119a, 119b are provided displaceably in the substantially horizontal direction (direction of the arrow C or D) in accordance with the driving action of the first cylinder 90, and they are provided displaceably in the vertical direction (direction of the arrow E or F) in accordance with the driving action of the second cylinder 106.

A sixth plate 115, which extends in a substantially horizontal direction, is fixed to the block member 114. A first sensor 117 for detecting the timing of the downward movement of the stopper block 118 is installed to the sixth plate 115 in a state of being inclined by a predetermined angle (see FIG. 11). The first sensor 117 is provided to detect the projection of the fixing band 28b in the rotating state before arrival at the substantially horizontal state so that the first stopper mechanism 82 is energized on the basis of a detection signal outputted from the first sensor 117 to move the stopper block 118 downwardly.

A second sensor 121 for detecting the projection 30 is contained in a first end 118a of the stopper block 118 which makes abutment against the projection 30 of the fixing band 28b (see FIG. 21). The second sensor 121 is arranged at a position deviated by a predetermined distance in a substantially horizontal direction from a substantially central portion of the first end of the stopper block 118 (see FIG. 22).

Each of the first sensor 117 and the second sensor 121 is composed of, for example, a distance-setting type photoelectric switch to receive a reflected light beam reflected after hitting the workpiece. Accordingly, the spacing distance between the workpiece and each of the first sensor 117 and the second sensor 121 is detected. The output signal is derived when the spacing distance detected by each of the first sensor 117 and the second sensor 121 is coincident with a preset distance.

The second stopper mechanism 84 is constructed in substantially the same manner as the first stopper mechanism 82. As shown in FIG. 12, the former is different from the latter in that the stopper block 118 is provided with a pressing tab 123 for making contact under pressure with the projection 30 by the aid of the resilient force of a spring member 122. When the boot 18 made of resin and the fixing band 28a are rotated in an integrated manner in accordance with the driving action of the rotary driving source 24, the fixing band 28a, which is installed to the large diameter annular attachment section of the boot 18 made of resin, may be rotated together with the boot 18 made of resin to give a wavy state. When the pressing tab 123 makes contact under pressure with the fixing band 28a in accordance with the action of the resilient force of the spring member 122, it is possible to avoid the wavy state of the fixing band 28a installed to the large diameter annular attachment section.

The band-tightening section 34 comprises a first tightening mechanism 124 (see FIG. 13) for forcibly nipping the projection 30 of the fixing band 28b to be installed to the small diameter annular attachment section of the boot 18 made of resin, and a second tightening mechanism 126 (see FIG. 14) for forcibly nipping the projection 30 of the fixing band 28a to be installed to the large diameter annular attachment section of the boot 18 made of resin. In this arrangement, the first tightening mechanism 124 and the second tightening mechanism 126 are constructed in substantially the same manner. The first tightening mechanism 124 will be explained in detail below. Constitutive components of the second tightening mechanism 126 corresponding to those of the first tightening mechanism 124 are designated by the same reference numerals, explanation of which will be omitted.

Figure 13:
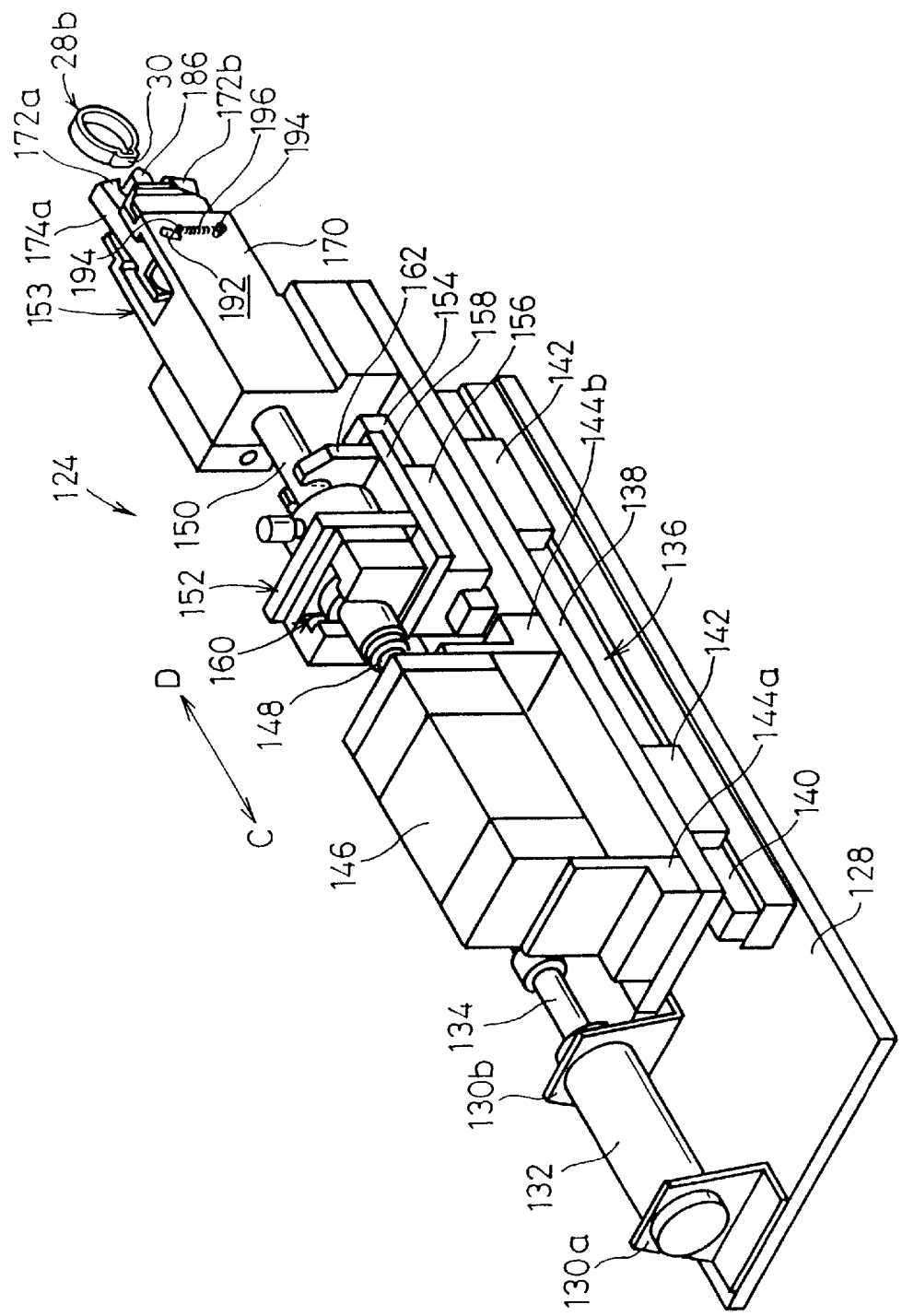
FIG. 13 shows a perspective view illustrating a first tightening mechanism for constructing a band-tightening section.

As shown in FIG. 13, the first tightening mechanism 124 includes a seventh plate 128 which is fixedly provided on the base 22, a third cylinder 132 which is fixed to the seventh plate 128 by the aid of fixing fixtures 130a, 130b, and a lengthy eighth plate 138 which is connected to a first end of a piston rod 134 of the third cylinder 132 and which is provided displaceably linearly in accordance with the guiding action of a linear guide 136. The linear guide 136 comprises a lengthy guide rail 140 and a pair of guide blocks 142 which are provided slidably along the guide rail 140.

The first tightening mechanism 124 further includes a fourth cylinder 146 which is fixedly provided on an upper surface portion of the eighth plate 138 by the aid of a pair of fixing fixtures 144a, 144b, a joint means 152 which is connected to a first end of a piston rod 148 of the fourth cylinder 146 and which is provided with a shaft 150 for transmitting the forward/backward movement of the piston rod 148 thereto, and a forcible nipping means 153 which is fixed to the eighth plate 138 and which is provided with a hole for inserting a first end of the shaft 150 therethrough.

Figure 15:
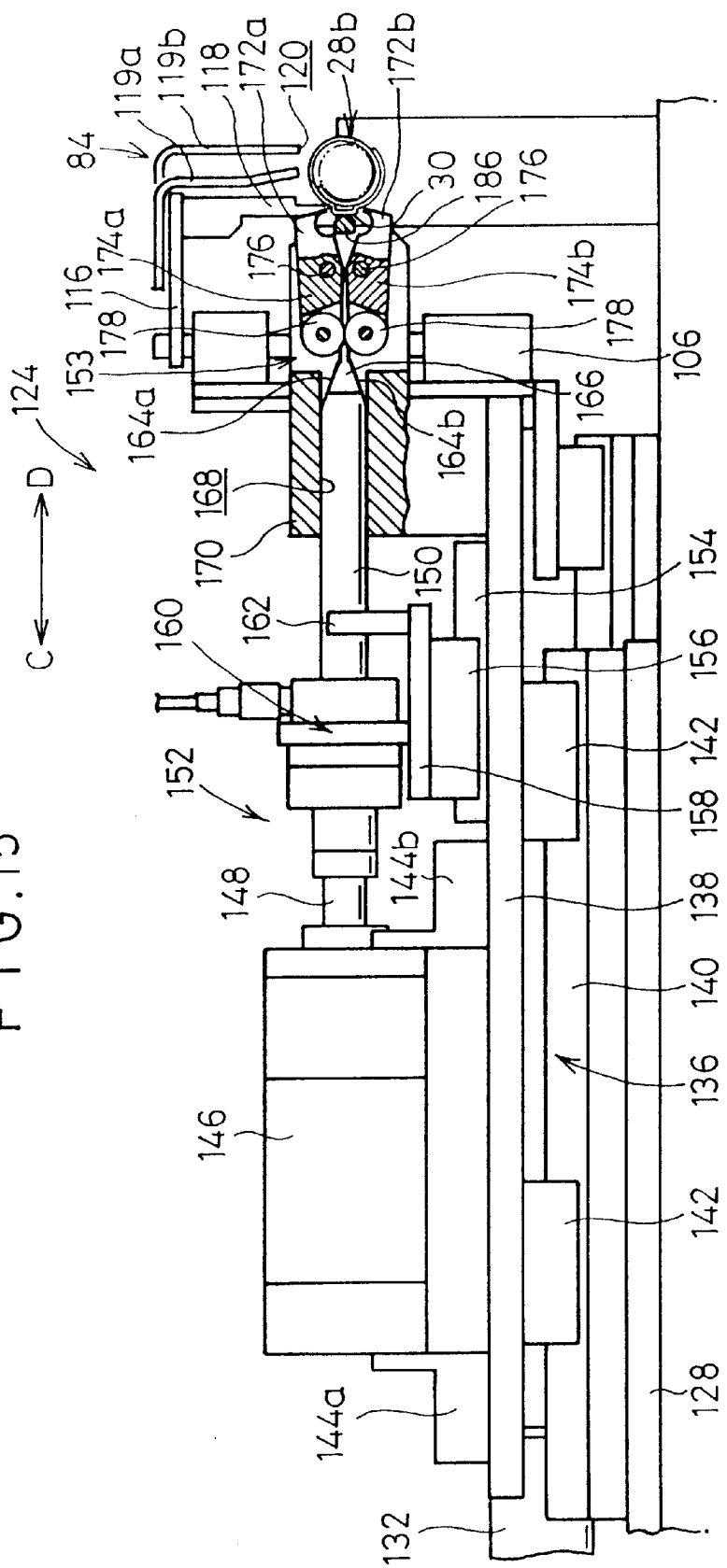
FIG. 15 shows a partial longitudinal sectional view taken along an axial direction of the first tightening mechanism.

The joint means 152 has a guide block 156 and a ninth plate 158 which are provided slidably along a guide rail 154 fixed to the eighth plate 138, a plurality of connecting members 160 which are fixed on the ninth plate 158, the shaft 150 to which the forward/backward movement of the piston rod 148 is transmitted via the plurality of connecting members 160, and a block 162 which prevents the shaft 150 from rotation and which supports the shaft 150. The shaft 150 is provided at its first end with an engaging section 166 which is formed to be gradually thin-walled by mutually opposing inclined surfaces 164a, 164b as viewed from a lateral position (see FIG. 15) and which is formed to have a rectangular substantially flat plate-shaped configuration as viewed from an upper position (see FIG. 16).

Figure 24:
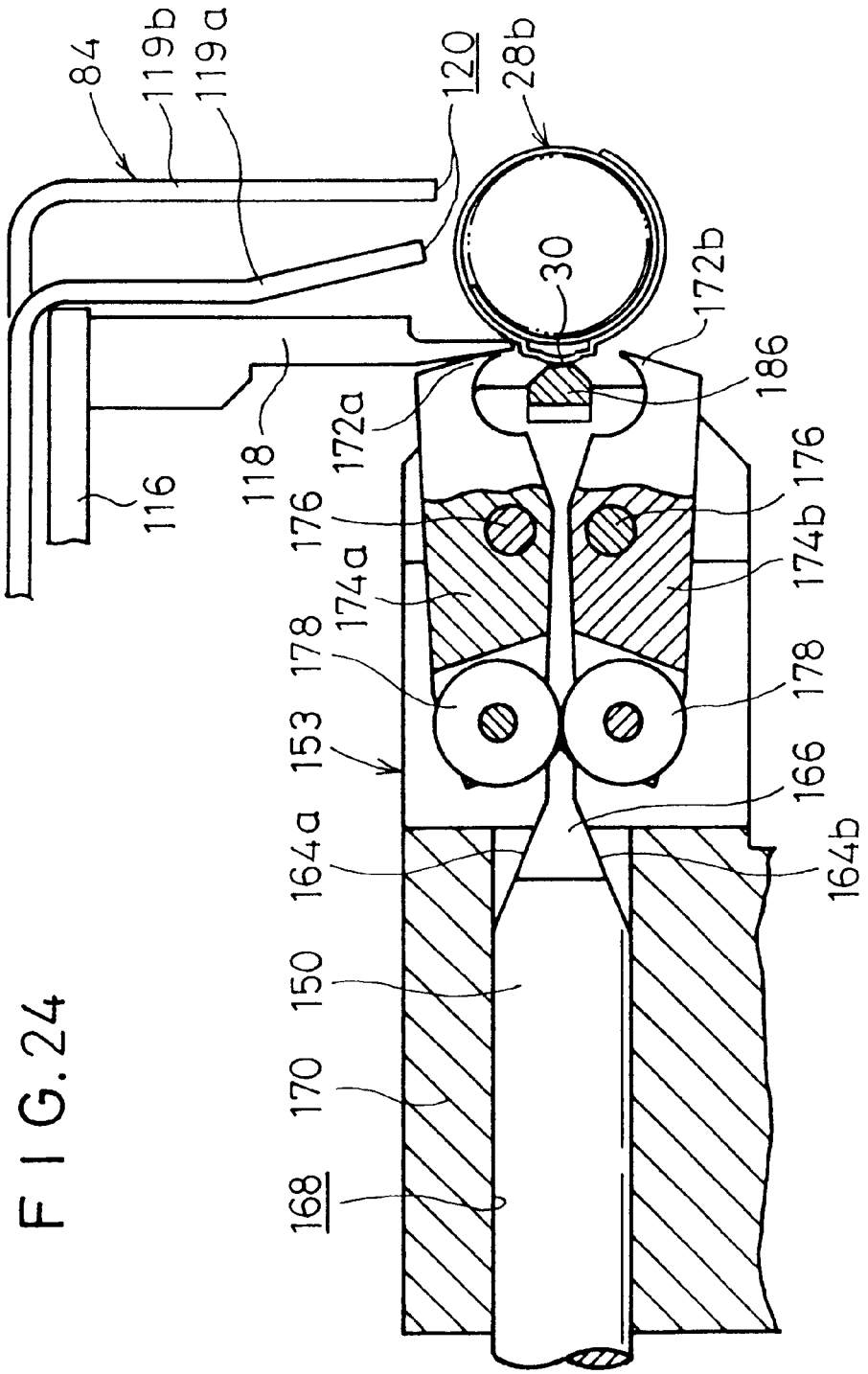
FIG. 24 shows a partial magnified longitudinal sectional view illustrating a state in which the projection of the fixing band is positioned by the stopper block, and it is held by the holding section.
Figure 25:
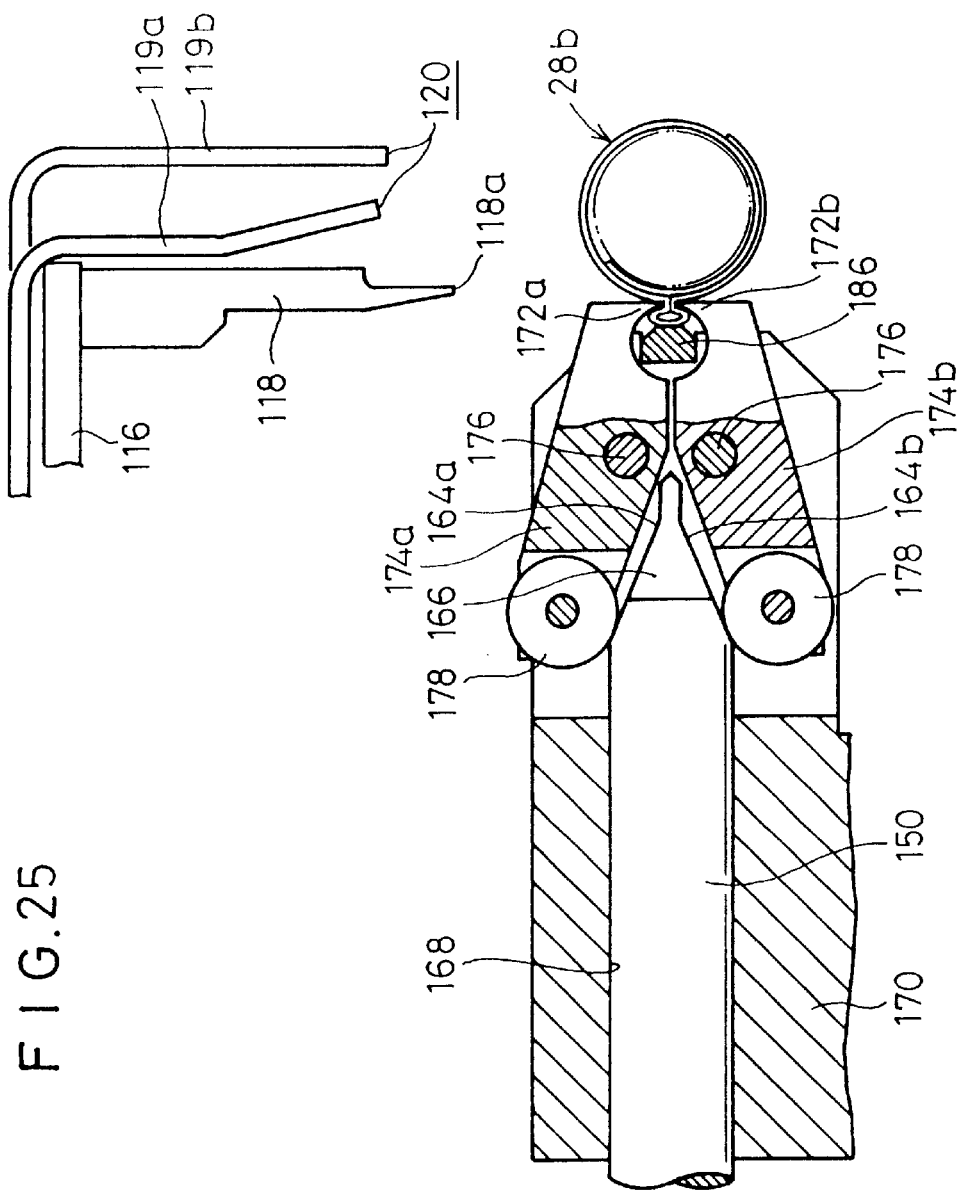
FIG. 25 shows a partial magnified longitudinal sectional view illustrating a state in which a shaft is displaced starting from the state shown in FIG. 21, and the projection of the fixing band is forcibly nipped by pawls.

The forcible nipping means 153 includes a housing 170 which is fixed to the eighth plate 138 and which has a through-hole 168 formed at the inside to make sliding movement of the shaft 150, and a pair of forcible nipping segments 174a, 174b which are provided in the vertical direction at an opening of the housing 170 and which are provided at their first ends with sharp pawls 172a, 172b for forcibly nipping the projection 30. As shown in FIGS. 24 and 25, the pair of forcible nipping segments 174a, 174b are provided with the pawls 172a, 172b which are capable of making approach or separation with the support points of pins 176 rotatably attached at substantially central portions respectively. Rollers 178 are rotatably attached to second ends of the forcible nipping segments 174a, 174b. An engaging section 166, which is formed at a first end of the shaft 150, is engaged between the pair of rollers 178. When the shaft 150 is displaced in the direction of the arrow D, and the engaging section 166 is wedged into the space between the pair of rollers 178, then the pair of rollers 178 are separated from each other, and the pawls 172a, 172b make approach to one another with the support points of the pins 176. As a result, the projection 30 of the fixing band 28b is forcibly nipped by the pawls 172a, 172b of the pair of forcible nipping segments 174a, 174b. Accordingly, the fixing band 28b is tightened.

Figure 16:
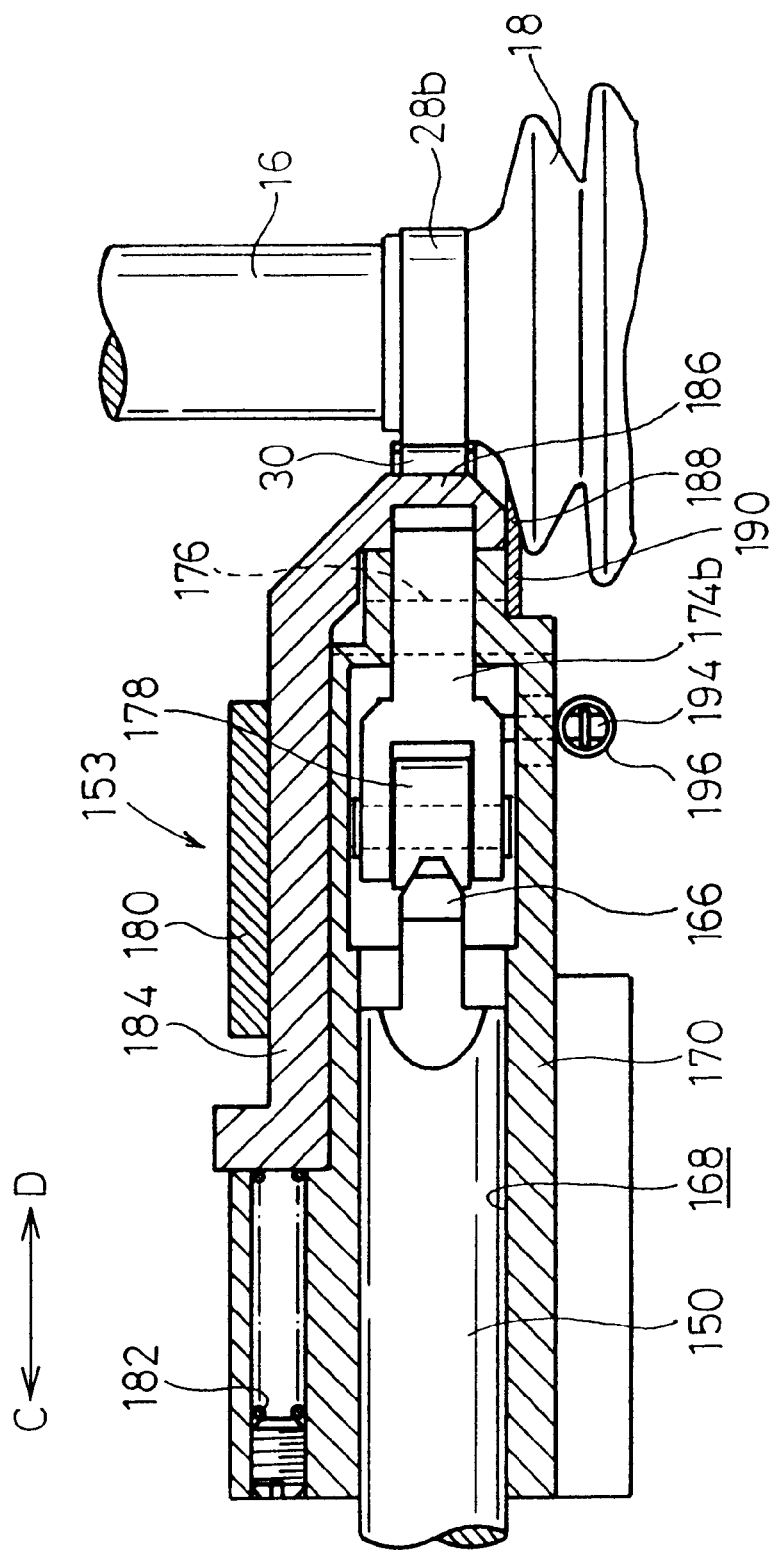
FIG. 16 shows a cross-sectional view taken along the axial direction of the first tightening mechanism.

As shown in FIG. 16, the forcible nipping means 153 has a pressing member 184 which is supported by a support member 180 installed to the housing 170 and which is always urged in the direction of the arrow D by means of the resilient force of a spring member 182. The pressing member 184 has a holding section 186 which extends in a substantially horizontal direction between the pair of pawls 172a, 172b separated from each other by a predetermined distance and which abuts against the projection 30 of the fixing band 28b in accordance with the action of the resilient force of the spring member 182 to press the projection 30. A plate 190, which is used to guide the pressing member 184 with a tapered section 188 to make engagement with the bellows section of the boot 18 made of resin to protect the boot 18 made of resin, is installed to a stepped section of the housing 170.

Figure 14:
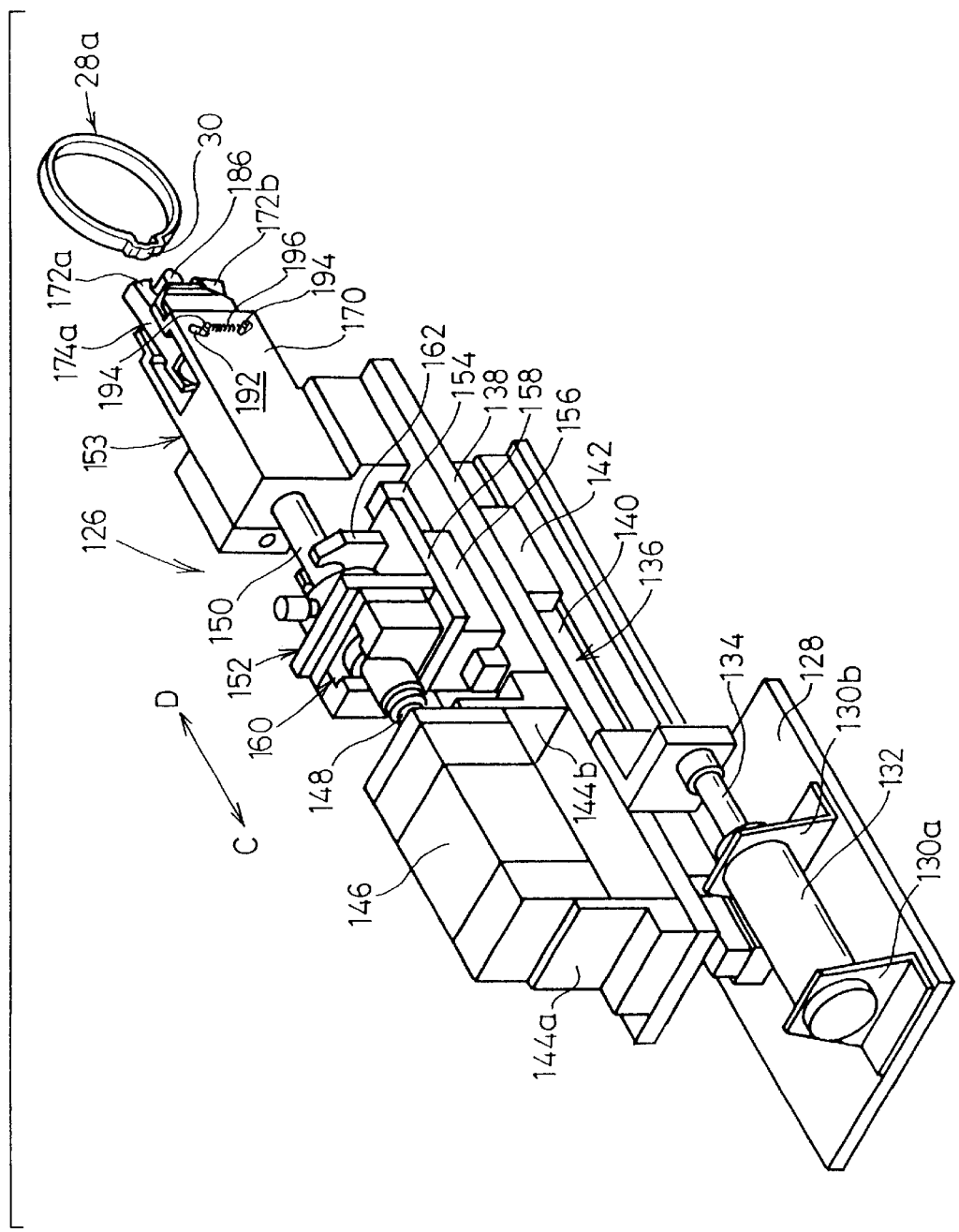
FIG. 14 shows a perspective view illustrating a second tightening mechanism for constructing the band-tightening section.

As shown in FIGS. 13 and 14, pins 194, which protrude toward the outside from the housing 170 via long holes 192, are secured to side portions of the pair of forcible nipping segments 174a, 174b respectively. The pair of rollers 178 are always urged to make abutment by the aid of the resilient force of a spring member 196 fastened between the pair of pins 194.

The fixing band-tightening apparatus 10 according to the embodiment of the present invention is basically constructed as described above. Next, its operation, function, and effect will be explained.

The bar field type constant velocity universal joint 12, which is connected to the first end of the drive shaft 16, is held by the first holding mechanism 38. The tripod type constant velocity universal joint 14, which is connected to the second end of the drive shaft 16, is held by the second holding mechanism 42. In this case, the boot 18 made of resin is installed to the bar field type constant velocity universal joint 12. The boot 20 made of rubber is installed to the tripod type constant velocity universal joint 14.

Figure 27:
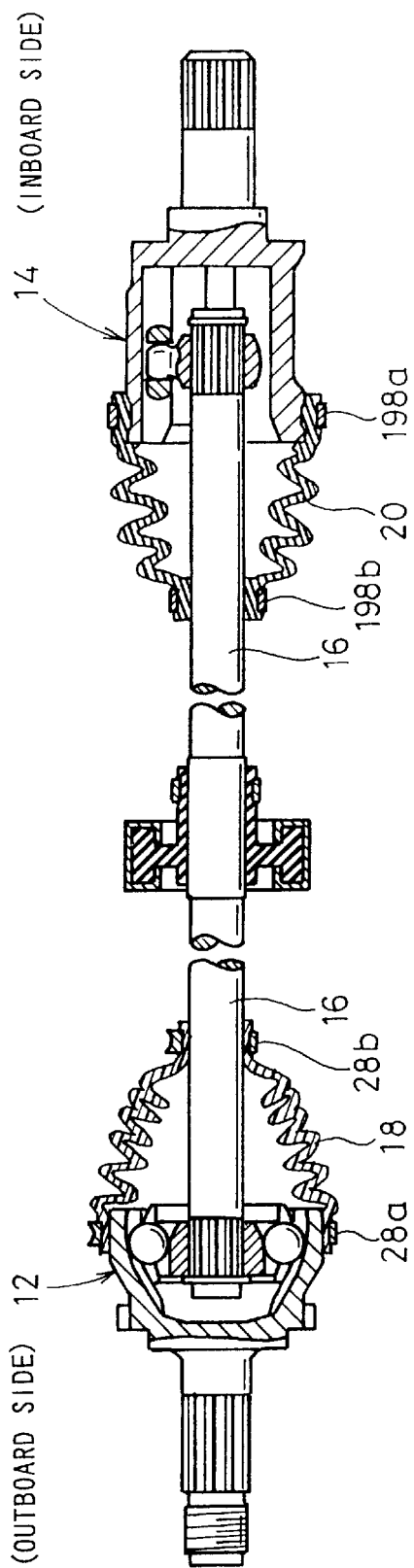
FIG. 27 shows a longitudinal sectional view taken along an axial direction of a drive shaft to which a bar field type constant velocity universal joint is connected at one end and a tripod type constant velocity universal joint is connected at the other end.

It is assumed that steel belts 198a, 198b have been already installed by an unillustrated apparatus to the large diameter annular attachment section and the small diameter annular attachment section of the boot 20 made of rubber in the previous step respectively (see FIG. 27).

The fixing bands 28a, 28b, which are installed to the large diameter annular attachment section and the small diameter annular attachment section of the boot 18 made of resin respectively, are rounded in a substantially circular configuration. The projection 30, which protrudes outwardly, is formed at a part of each of the circumscribing fixing bands 28a, 28b. The first end on the outer circumferential side of each of the fixing bands 28a, 28b is fastened by inserting a plurality of hook-shaped fastening pawls 200a to 200c into fastening holes 202a to 202c (see FIGS. 21 and 22).

At first, explanation will be made for a process in which the deformed portion of the bellows section 35 of the boot 18 made of resin is pressed by the bellows section-pressing mechanism 37, so that the deformed portion is prevented from the contact with the pawls 172a, 172b for forcibly nipping the projection 30 of the fixing band 28b.

After the shaft section 49 of the constant velocity universal joint 12 is gripped by the pair of pinching blocks 78a, 78b for constructing the chuck mechanism 48, the cylinder 53 is driven to displace the pressing plate 61. The pressing plate 61 is displaced in the direction of the arrow L in accordance with the guiding action of the guide rod 63, and the flat surface section 65, which is formed to have the substantially U-shaped configuration, enters the boundary portion between the small diameter annular attachment section and the bellows section 35 (see FIG. 8).

Therefore, the deformed portion of the bellows section 35, which has protruded toward the small diameter annular attachment section, is pressed by the pressing plate 61 toward the large diameter annular attachment section. As a result, even when the bellows section 35 of the boot 18 made of resin is deformed, the fixing band 28b can be installed to the small diameter annular attachment section without causing the contact of the pawls 172a, 172b with the deformed portion of the bellows section 35.

When the cylinder 53 is further driven after the fixing band 28b is installed, then the pressing plate 61 is separated from the bellows section 35, and the initial position is restored to give the waiting state.

Next, explanation will be made for a process in which the large diameter annular attachment section is positioned at the predetermined position of the cup section 83 of the constant velocity universal joint 12 by using the large diameter side end-positioning mechanism 39a.

After the shaft section 49 of the constant velocity universal joint 12 is gripped by the pair of pinching blocks 78a, 78b for constructing the chuck mechanism 48, the pair of piston rods 69a, 69b are displaced in the direction of the arrow B by driving the cylinder 67. The collar 81, which is connected to the displacement member 73, is displaced in the direction of the arrow B in accordance with the guiding action of the unillustrated guide rail, in accordance with the displacement action of the pair of piston rods 69a, 69b. The collar 81 enters along the outer circumferential surface of the cup section 83 of the constant velocity universal joint 12. The first end 81a of the collar 81 abuts against the end of the large diameter annular attachment section of the boot 18 made of resin (see FIG. 8).

Explanation will be made for a process in which the small diameter annular attachment section is positioned at the predetermined position of the drive shaft 16 by using the small diameter side end-positioning mechanism 39b in the same manner as described above.

The support blocks 103a to 103d are displaced along the arrow R shown in FIG. 9 in accordance with the driving action of the first and second cylinders 87, 93, and the chuck member 99 is energized to displace the pair of support members 47a, 47b in the directions to make approach to one another. Accordingly, the drive shaft 16 is held by the circular arc-shaped projections 113a to 113d. In this process, the ends of the circular arc-shaped projections 113a to 113d abut against the small diameter annular attachment section of the boot 18 made of resin. Thus, the small diameter annular attachment section is positioned at the predetermined position of the drive shaft 16.

Therefore, even when the large diameter annular attachment section and the small diameter annular attachment section of the boot 18 made of resin are deviated from the predetermined positions, then the first end 81a of the collar 81 abuts against the large diameter annular attachment section to avoid the positional discrepancy from the predetermined position, and the ends of the circular arc-shaped projections 113a to 113d of the support blocks 103a to 103d abut against the small diameter annular attachment section to avoid the positional discrepancy from the predetermined position. Thus, the large diameter and small diameter annular attachment sections are reliably positioned at the predetermined positions respectively.

As described later on, when the constant velocity universal joint 12 is rotated integrally with the drive shaft 16 in accordance with the driving action of the rotary driving source 24, the collar 81 is rotated integrally with the cup section 83 by the aid of the annular member 79 to make engagement with the pair of rollers 77a, 77b. Accordingly, the fixing band 28a can be installed to the large diameter annular attachment section while maintaining the state in which the large diameter annular attachment section is positioned at the predetermined position.

Similarly, the rollers 101a to 101d of the support blocks 103a to 103d are rotated, and thus the fixing band 28b can be installed to the small diameter annular attachment section while maintaining the state in which the small diameter annular attachment section is positioned at the predetermined position.

In this case, it is preferable that the cylinders 53, 67 are operated substantially simultaneously to operate the bellows section-pressing mechanism 37 and the end-positioning mechanism 39 substantially simultaneously.

Subsequently, explanation will be made for a process in which the fixing band 28a having the large diameter and the fixing band 28b having the small diameter, which are loosely fitted to the large diameter annular attachment section and the small diameter annular attachment section of the boot 18 made of resin respectively, are tightened substantially simultaneously.

At first, the rotary driving source 24 is driven, and thus the bar field type constant velocity universal joint 12, the tripod type constant velocity universal joint 14, and the drive shaft 16, which are coaxially held by the first holding mechanism 38 and the second holding mechanism 42, are rotated in an integrated manner respectively. In this process, the pair of fixing bands 28a, 28b are loosely fitted to the large diameter annular attachment section and the small diameter annular attachment section of the boot 18 made of resin with slight clearances respectively. When the boot 18 made of resin is rotated, the pair of fixing bands 28a, 28b are also rotated in accordance therewith. Therefore, the projections 30 of the fixing bands 28a, 28b are in the rotating state about the center of the central axis of the drive shaft 16.

Figure 19:
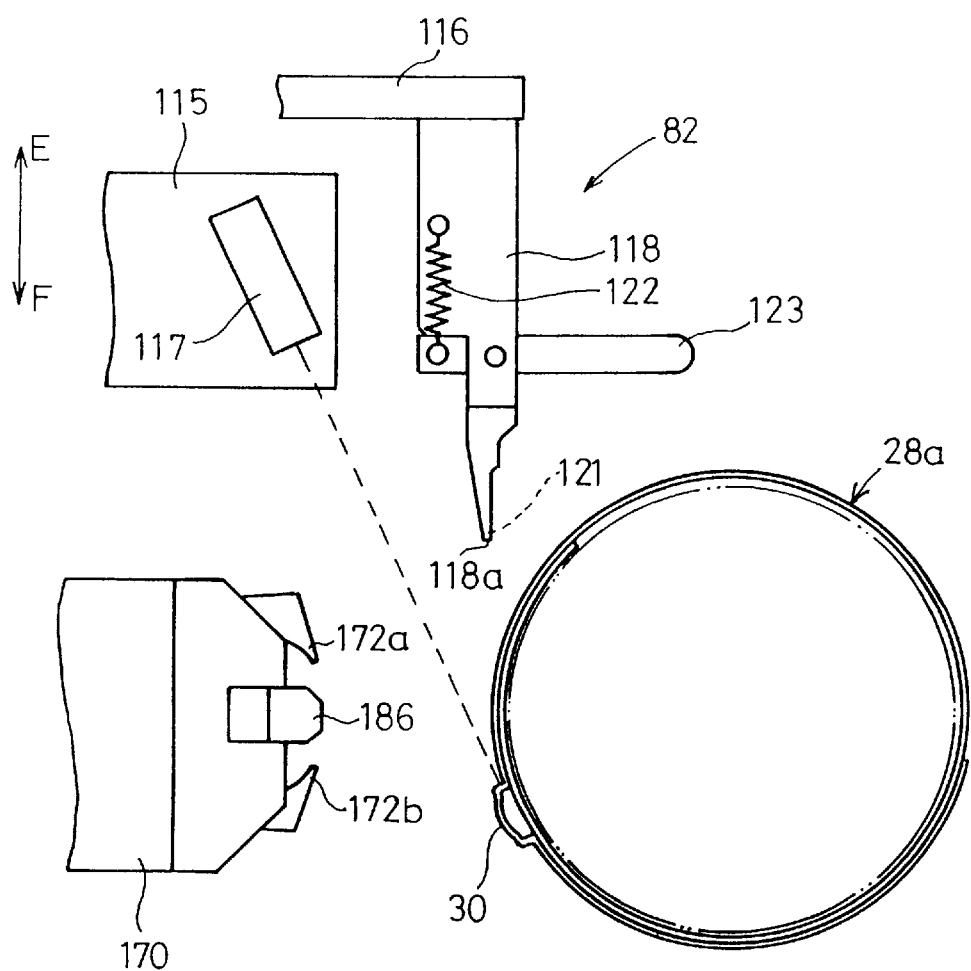
FIG. 19 illustrates an operation depicting a state in which the projection of the fixing band is detected by using a sensor contained in a first end of a stopper block.

Subsequently, the projections 30 of the fixing bands 28a, 28b in the rotating state before arrival at the substantially horizontal state are detected by the first sensor 117 (see FIG. 19). The first stopper mechanism 82 and the second stopper mechanism 84, which constitute the stopper section 32, are energized respectively on the basis of the detection signal outputted from the first sensor 117 to move the stopper block 118 downwardly. Therefore, the first end 118a of the stopper block 118 abuts against the projection 30 of the fixing band 28a, 28b loosely fitted to the boot 18 made of resin. The projection 30 is detected by the second sensor 121 which is contained in the first end 118a of the stopper block 118. Thus, the projections 30 of the fixing bands 28a, 28b are positioned in the substantially horizontal state (see FIG. 20).

Figure 17:
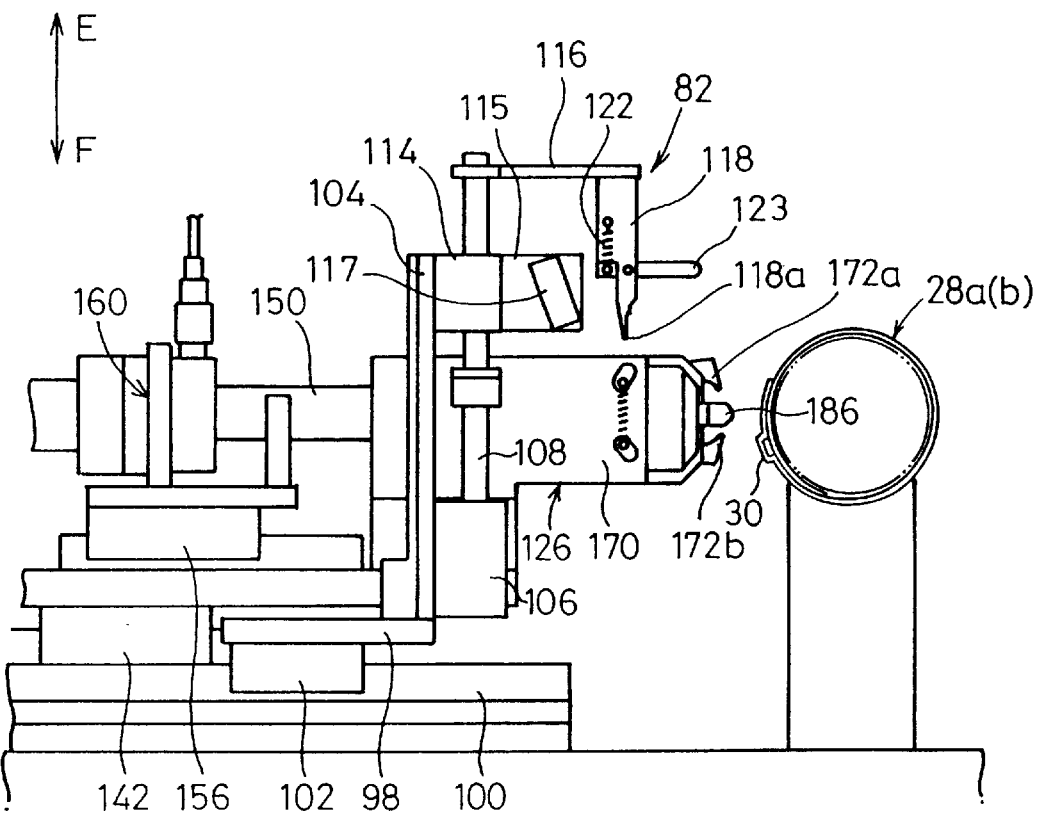
FIG. 17 illustrates an operation effected when the stopper section and the band-tightening section are at initial positions.
Figure 18:
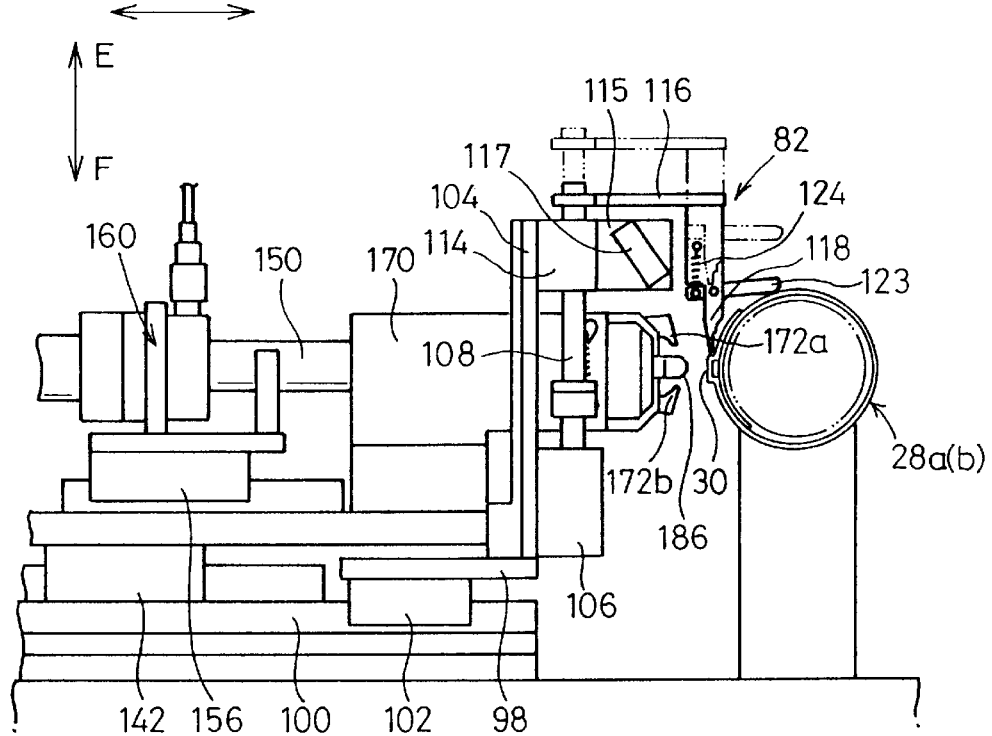
FIG. 18 illustrates an operation depicting a state in which a stopper plate for constructing the stopper section abuts against a projection of a fixing band and it is positioned.

That is, starting from the initial position shown in FIG. 17, the first stopper mechanism 82 and the second stopper mechanism 84 are operated as follows respectively. That is, the stopper block 118 is displaced by the predetermined distance in the substantially horizontal direction (direction of the arrow D) in accordance with the driving action of the first cylinder 90. After that, the stopper block 118 is moved downwardly (in the direction of the arrow F) in accordance with the driving action of the second cylinder 106 on the basis of the detection signal outputted from the first sensor 117. Accordingly, the stopper block 118 is allowed to abut against the projection 30 which is rotated together with the boot 18 made of resin (see FIG. 18). The stopper block 118 abuts against the projection 30 of each of the fixing bands 28a, 28b. Accordingly, each of the projections 30 is positioned at the position disposed in the substantially horizontal direction (lateral direction) of the boot 18 made of resin.

In this case, even in the state in which the projection 30 is positioned at the predetermined position by the stopper block 118, the boot 18 made of resin and the drive shaft 16 are in the rotating state in accordance with the driving action of the rotary driving source 24, due to the clearance between the boot 18 made of resin and the fixing band 28a, 28b. As described above, it is possible to avoid the co-rotating state and the wavy state of the fixing bands 28a, 28b by the aid of the tubes 119a, 119b and the pressing tab 123 provided for the first and second stopper mechanisms 82, 84.

The fact that the projection 30 is positioned at the predetermined position is confirmed by the detection signal from the second sensor 121. When the stopper block 118 does not abut against the projection 30 of the fixing band 28a, 28b, namely when the projection 30 is not positioned at the predetermined position, then the stopper block 118 is moved upwardly in accordance with the driving action of the second cylinder 106 to give the waiting state at the initial position.

Figure 28:
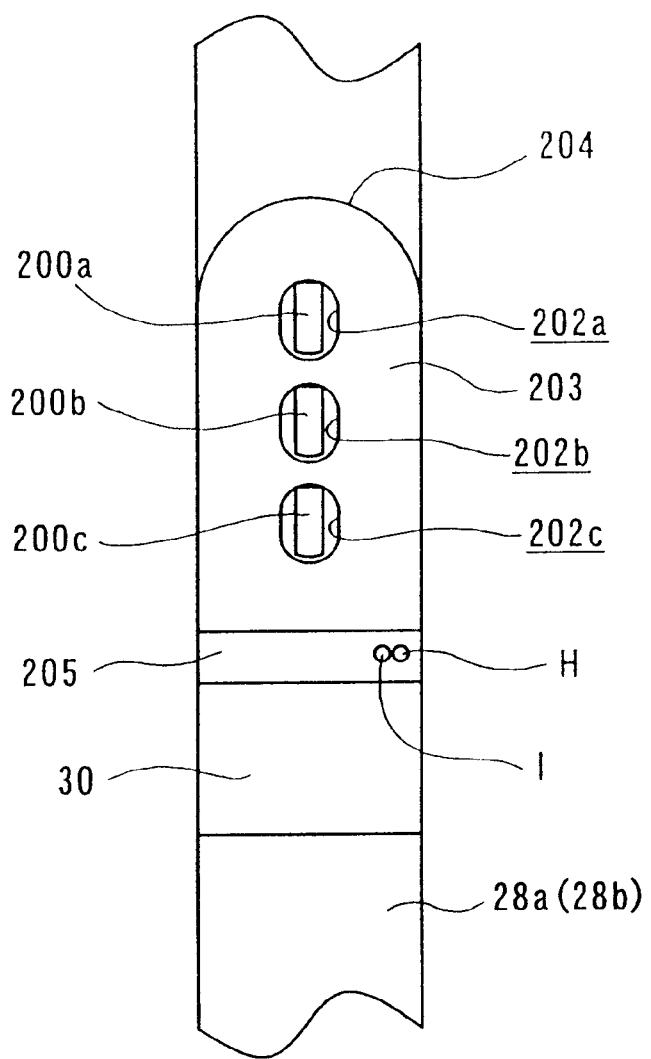
FIG. 28 shows a view as viewed in a direction of an arrow G shown in FIG. 21, illustrating the fixing band.

In the embodiment of the present invention, the second sensor 121 is contained in the first end 118a of the stopper block 118 which makes abutment against the projection 30 of the fixing band 28a, 28b. The second sensor 121 is arranged at the portion which is deviated by the predetermined distance in the substantially horizontal direction via the recess from the substantially central portion of the first end 118a of the stopper block 118 (see FIG. 22). Further, as shown in FIG. 28, the first sensor 117 and the second sensor 121 are designed to sense a pin point H and a pin point I on the wall surface 205 protruding from the flat surface section 203 of each of the fixing bands 28a, 28b and being continuous to the projection 30. The pin point H is a detection point to detect the timing when the stopper block 118 is moved downwardly. The pin point I is a detection point to detect the projection 30 which abuts against the stopper block 118. The pin points H and I are arranged substantially in parallel at portions deviated by predetermined distances in the substantially horizontal direction from the central portion of each of the fixing bands 28a, 28b.

Therefore, the first sensor 117 and the second sensor 121 do not detect the stepped section 204 (see FIG. 21) formed by the first end on the outer circumferential side of the fixing band 28a, 28b wound in the substantially circular configuration. Further, the first sensor 117 and the second sensor 121 do not detect the hook-shaped fastening pawls 200a to 200c to be fastened to the fastening holes 202a to 202c of the fixing bands 28a, 28b.

In other words, when the detection points to be sensed by the first sensor 117 and the second sensor 121 are set to be the pin point H and the pin point I which are deviated by the predetermined distances in the substantially horizontal direction from the central portion of the fixing band 28a, 28b, then the first sensor 117 and the second sensor 121 can detect only the projection 30 of the fixing band 28a, 28b in a reliable manner, without detecting the hook-shaped fastening pawls 200a to 200c and the stepped section 204 formed at the first end on the outer circumferential side of the fixing band 28a, 28b. Therefore, it is possible to avoid such erroneous detection that the stepped section 204 and the hook-shaped fastening pawls 200a to 200c are detected as the projection 30, and it is possible to improve the detection accuracy.

Subsequently, in the state in which the projections 30 of the fixing bands 28a, 28b are positioned, the first tightening mechanism 124 and the second tightening mechanism 126 for constructing the band-tightening section 34 are operated respectively to tighten the fixing bands 28a, 28b in accordance with the forcible nipping action effected by the pair of pawls 172a, 172b in the state in which the projection 30 is held by the holding section 186.

Figure 23:
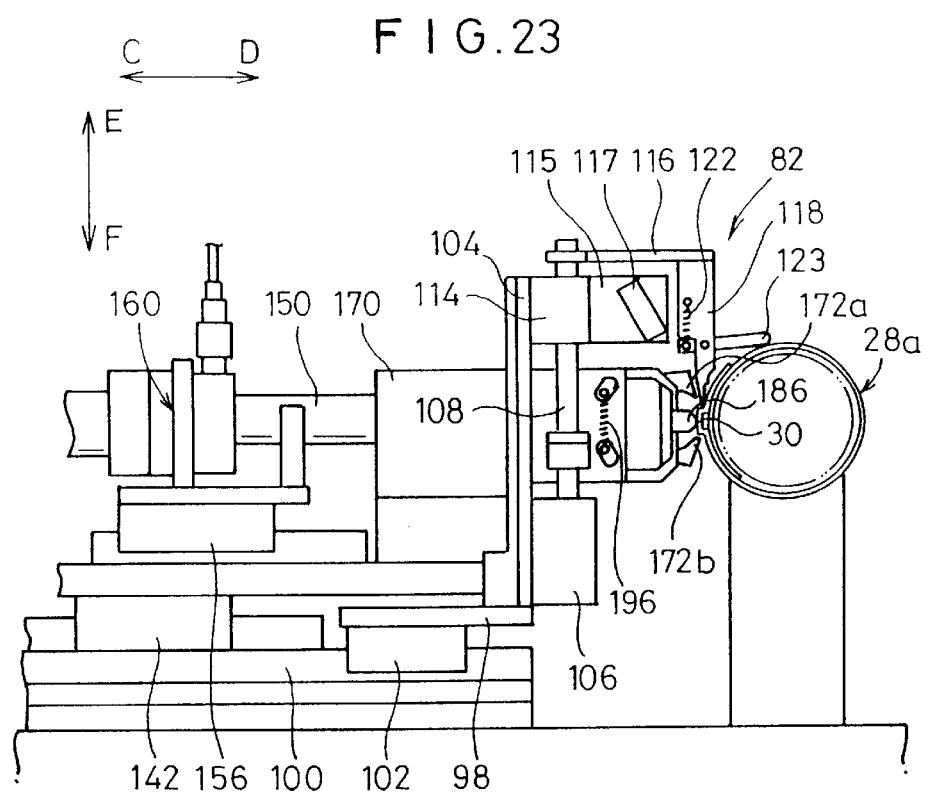
FIG. 23 shows an operation illustrating a state in which the band-tightening section is displaced, and the projection of the fixing band is held by the holding section.

That is, the third cylinder 132 is driven, and the eighth plate 138 is displaced in the direction of the arrow D in accordance with the guiding action of the linear guide 136. Accordingly, the joint means 152 and the forcible nipping means 153 are displaced in an integrated manner together with the eighth plate 138. The holding section 186, which is provided between the pair of pawls 172a, 172b, abuts against the projection 30 of the fixing band 28a, 28b (see FIG. 23). After the projection 30 of the fixing band 28a, 28b is held in the substantially horizontal state by the holding section 186, the rotary driving source 24 is deenergized to stop the rotation of the boot 18 made of resin and the drive shaft 16.

In the state in which the projection 30 of the fixing band 28a, 28b is held substantially horizontally by the holding section 186, each of the stopper blocks 118 is moved upwardly in accordance with the driving action of the second cylinder 106. Accordingly, the stopper block 118 is separated from the projection 30. Further, when the shaft 150 is displaced in the direction of the arrow D in accordance with the driving action of the fourth cylinder 146, the pair of pawls 172a, 172b are operated in the directions to make approach to one another with the support points of the pins 176 to forcibly nit the projection 30 (see FIG. 26).

That is, when the fourth cylinder 146 is driven, the shaft 150, which is connected to the piston rod 148 coaxially via the joint means 152, is displaced in an integrated manner in the direction of the arrow D. The engaging section 166, which is formed at the first end of the shaft 150, is wedged into the space between the pair of rollers 178 by the aid of the inclined surfaces 164a, 164b. Accordingly, the pair of rollers 178 are separated from each other, and the pawls 172a, 172b approach to one another with the support points of the pins 176. As a result, the projection 30 of the fixing band 28a, 28b is forcibly nipped by the pawls 172a, 172b of the pair of forcible nipping segments 174a, 174b. Accordingly, the fixing bands 28a, 28b are tightened substantially simultaneously (see FIGS. 24 and 25).

After the tightening operation for the fixing band 28a, 28b is completed, the fourth cylinder 146 is driven to displace the shaft 150 in the direction (direction of the arrow C) opposite to the above. Accordingly, the projection 30 is released from the forcible nipping state. That is, the engaging section 166 of the shaft 150 is separated from the space between the pair of rollers 178. The pair of rollers 178 approach to one another in accordance with the resilient force of the spring member 196 fastened to the pins 194. Accordingly, the pair of pawls 172a, 172b are operated in the directions to make separation from each other with the pins 176 as the support points. Thus, the projection 30 is released from the forcible nipping state.

Further, the eighth plate 138 is displaced in the direction (direction of the arrow D) opposite to the above in accordance with the driving action of the third cylinder 132, and the first cylinder 90 and the second cylinder 106 are driven. Thus, the first stopper mechanism 82 and the second stopper mechanism 84 are restored to the initial positions.

In the embodiment of the present invention, owing to the provision of the bellows section-pressing mechanism 37, even when the bellows section 35 of the boot 18 made of resin is deformed, the fixing band 28b can be smoothly installed to the small diameter annular attachment section disposed closely to the bellows section 35, without making the contact of the pawls 172a, 172b with the deformed portion. Therefore, the bellows section 35 of the boot 18 made of resin is not damaged, and the forward/backward movement of the pawls 172a, 172b for forcibly nipping the projection 30 of the fixing band 28b is not obstructed. As a result, the occurrence of the trouble is previously avoided, which would be otherwise caused, for example, such that the operation of the fixing band-tightening apparatus 10 is stopped. Therefore, the tightening operation for the fixing band 28b is smoothly performed, and it is possible to improve the production efficiency.

In the embodiment of the present invention, the following effect is obtained. That is, owing to the provision of the large diameter side and small diameter side end-positioning mechanisms 39a, 39b respectively, even when the large diameter and/or small diameter annular attachment section of the boot 18 made of resin is deviated from the predetermined position, the positional discrepancy can be corrected to effect the positioning at the predetermined position. Further, the fixing band 28a, 28b is installed to the large diameter and/or small diameter annular attachment section while maintaining the positioned state. Therefore, the large diameter and/or small diameter annular attachment section is reliably constricted at the predetermined position of the cup section 83 and/or the drive shaft 16 by means of the fixing band 28a, 28b.

In the embodiment of the present invention, the projection 30 of the fixing band 28a, 28b is forcibly nipped in the state of being positioned in the substantially horizontal direction by means of the first stopper mechanism 82 and the second stopper mechanism 84. Therefore, substantially the same positional relationship is obtained with respect to the position for performing the welding and fusing by radiating the laser beam onto the steel belt 198a, 198b to be installed to the boot 20 made of rubber of the tripod type constant velocity universal joint 14. As a result, the layout can be harmonized with the existing apparatus (not shown), and it is possible to improve the versatility. It is unnecessary to change the existing production line. Therefore, it is possible to reduce the production cost in view of the fact that no new equipment investment is required.

In the embodiment of the present invention, the fixing bands 28a, 28b can be installed substantially simultaneously to the large diameter annular attachment section and the small diameter annular attachment section of the boot 18 made of resin respectively by using the first tightening mechanism 124 and the second tightening mechanism 126 which are constructed in substantially the same manner. Therefore, it is possible to improve the production efficiency.

The following problem may arise. That is, when the boot 18 made of resin and the fixing band 28a, 28b are rotated in an integrated manner in accordance with the driving action of the rotary driving source 24, then the fixing band 28a to be installed to the large diameter annular attachment section of the boot 18 made of resin is in the wavy state, while the fixing band 28b to be installed to the small diameter annular attachment section makes co-rotation.

However, in the embodiment of the present invention, the second stopper mechanism 84 on the side of the large diameter annular attachment section is provided with the pressing tab 123 for making contact under pressure with the projection 30 by the aid of the resilient force of the spring member 122. Accordingly, it is possible to avoid the occurrence of the wavy state and the co-rotation. Further, in the embodiment of the present invention, the first stopper mechanism 82 on the side of the small diameter annular attachment section is provided with one or a plurality of tubes 119a, 119b connected to the unillustrated air supply source. The air is discharged toward the rotating fixing band 28a, 28b from the blow ports 120 of the tubes 119a, 119b. Accordingly, it is possible to avoid the occurrence of the wavy state and the co-rotation.

The tubes 119a, 119b for discharging the air may be provided for the second stopper mechanism 84 on the side of the large diameter annular attachment section, and the pressing tab 123 for making contact under pressure with the projection 30 in accordance with the action of the tensile force of the spring member 122 may be provided for the first stopper mechanism 82 on the side of the small diameter annular attachment section. Alternatively, the pressing tab 123 and the tubes 119a, 119b may be simultaneously provided.

In the embodiment of the present invention, the detection points to be sensed by the first sensor 117 and the second sensor 121 are set to be the pin point H and the pin point I deviated by the predetermined distances in the substantially horizontal direction from the central portion of the fixing band 28a, 28b. Accordingly, the hook-shaped fastening pawls 200a to 200c and the stepped section 204 formed at the first end on the outer circumferential side of the fixing band 28a, 28b are not detected by the first sensor 117 and the second sensor 121. Only the projection 30 of the fixing band 28a, 28b is reliably detected. Therefore, the erroneous detection, in which the stepped section 204 and the hook-shaped fastening pawls 200a to 200c are detected as the projection 30, is avoided, and it is possible to improve the detection accuracy by detecting the projection 30 of the fixing band 28a, 28b as the pin point by using the second sensor 121.

Next, detailed explanation will be made below for a fixing band-tightening method for the boot 18 made of resin for the constant velocity universal joint.

Figure 29:
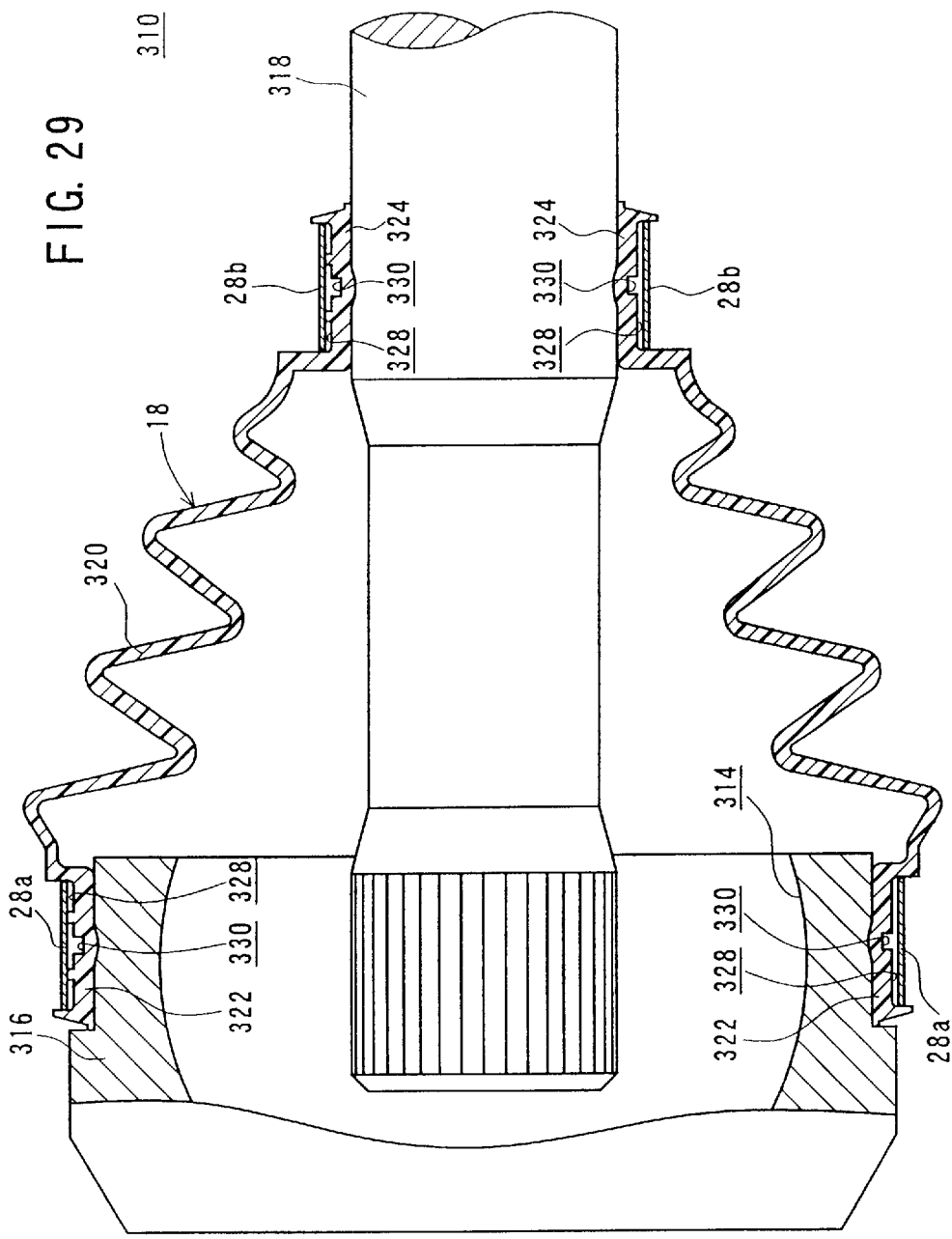
FIG. 29 shows, with partial omission, a longitudinal sectional view illustrating an arrangement of a constant velocity universal joint in a state in which the fixing band is loosely fitted to the boot made of resin by applying a fixing band-tightening method for the boot made of resin for the constant velocity universal joint.

As shown in FIG. 29, the constant velocity universal joint 310 comprises a cylindrical outer cup 316 having an opening 314 integrally connected to a first end of an unillustrated drive shaft. An inner member (not shown), which includes, for example, spiders and rollers connected to a first end of a driven shaft 318, is accommodated in the outer cup 316.

The constant velocity universal joint 310 is further provided with the boot 18 made of resin for surrounding a predetermined range of the outer cup 316 and the driven shaft 318. The boot 18 made of resin has a bellows section 320 which is formed to have a bellows-shaped configuration, a large diameter annular attachment section 322 which is formed integrally at both ends of the bellows section 320 and which has a large diameter to be installed to the outer circumferential surface of the outer cup 316, and a small diameter annular attachment section 324 which has a small diameter to be installed to the outer circumferential surface of the driven shaft 318.

The large diameter annular attachment section 322 and the small diameter annular attachment section 324 are formed to have substantially the same configuration except that they merely differ in diameter. Therefore, the same constitutive components are designated by the same reference numerals.

Figure 30:
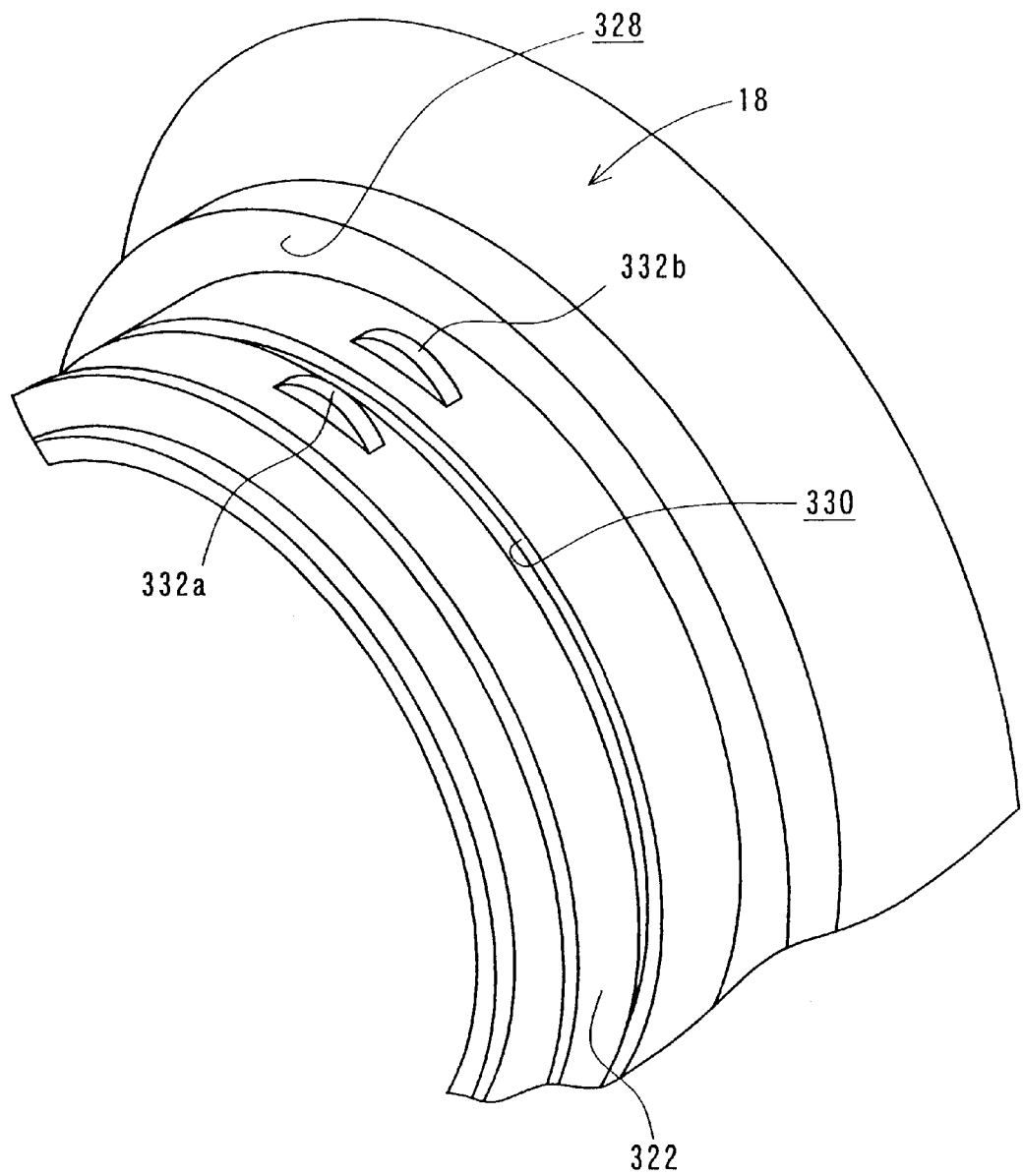
FIG. 30 shows, with partial omission, a perspective view illustrating the boot made of resin shown in FIG. 29.

As shown in FIG. 30, the large diameter annular attachment section 322 is formed with a band-mounting groove 328 which is composed of a recess with a width slightly wider than the width of the fixing band 28a and which extends in the circumferential direction, and an annular groove 330 which circumscribes at a substantially central portion of the band-mounting groove 328 respectively.

Figure 31:
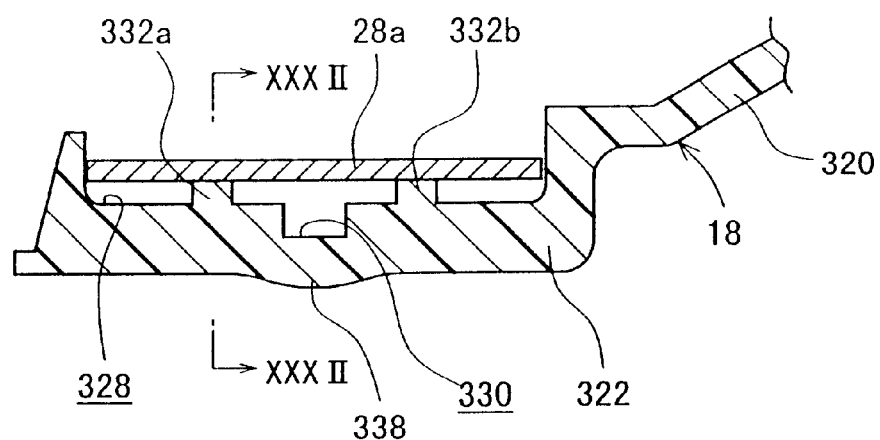
FIG. 31 shows a partial magnified vertical sectional view illustrating a large diameter annular attachment section for constructing the boot made of resin shown in FIG. 29.
Figure 32:
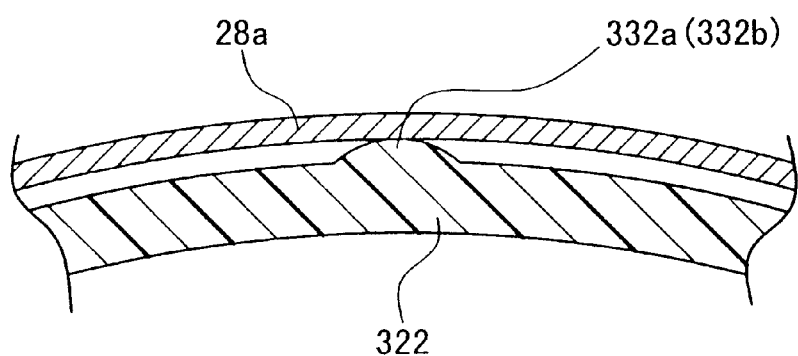
FIG. 32 shows a magnified vertical sectional view taken along a line XXXII—XXXII shown in FIG. 31.

As shown in FIG. 30, the band-mounting groove 328 is formed with a first small projection 332a and a second small projection 332b (frictional coefficient-increasing mechanism) which are separated from each other by a predetermined spacing distance with the annular groove 330 intervening therebetween respectively. Each of the first small projection 332a and the second small projection 332b is formed with a vertical cross-sectional configuration which is a curved circular arc-shaped configuration as viewed from the side of the driven shaft (see FIG. 32). On the other hand, each of them is formed with a vertical cross-sectional configuration which is a substantially rectangular configuration as viewed in a direction substantially perpendicular to the axis of the driven shaft (see FIG. 31).

Figure 33:
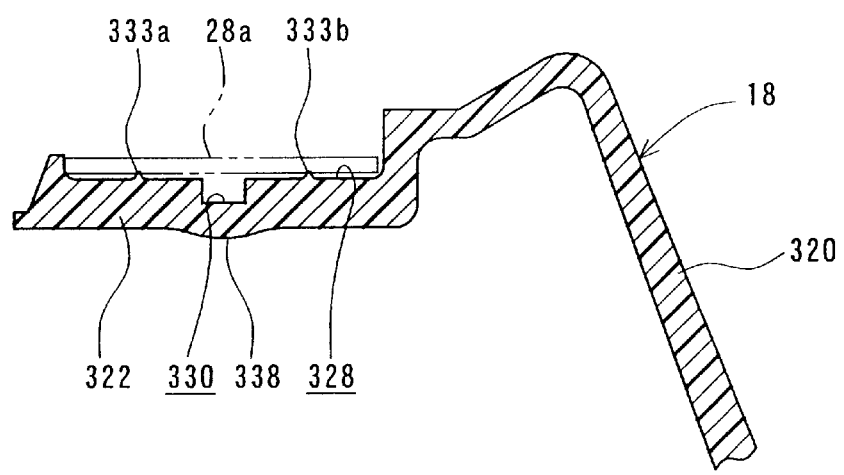
FIG. 33 shows a partial magnified vertical sectional view in which apexes of first and second small projections shown in FIG. 31 are formed to have an acute-angled configuration.

Alternatively, as shown in FIG. 33, it is also preferable to provide first and second small projections 333a, 333b, each of which is formed to have a substantially acute-angled apex protruding upwardly in a vertical cross-sectional configuration as viewed in the direction substantially perpendicular to the axis of the driven shaft 318.

Figure 34:
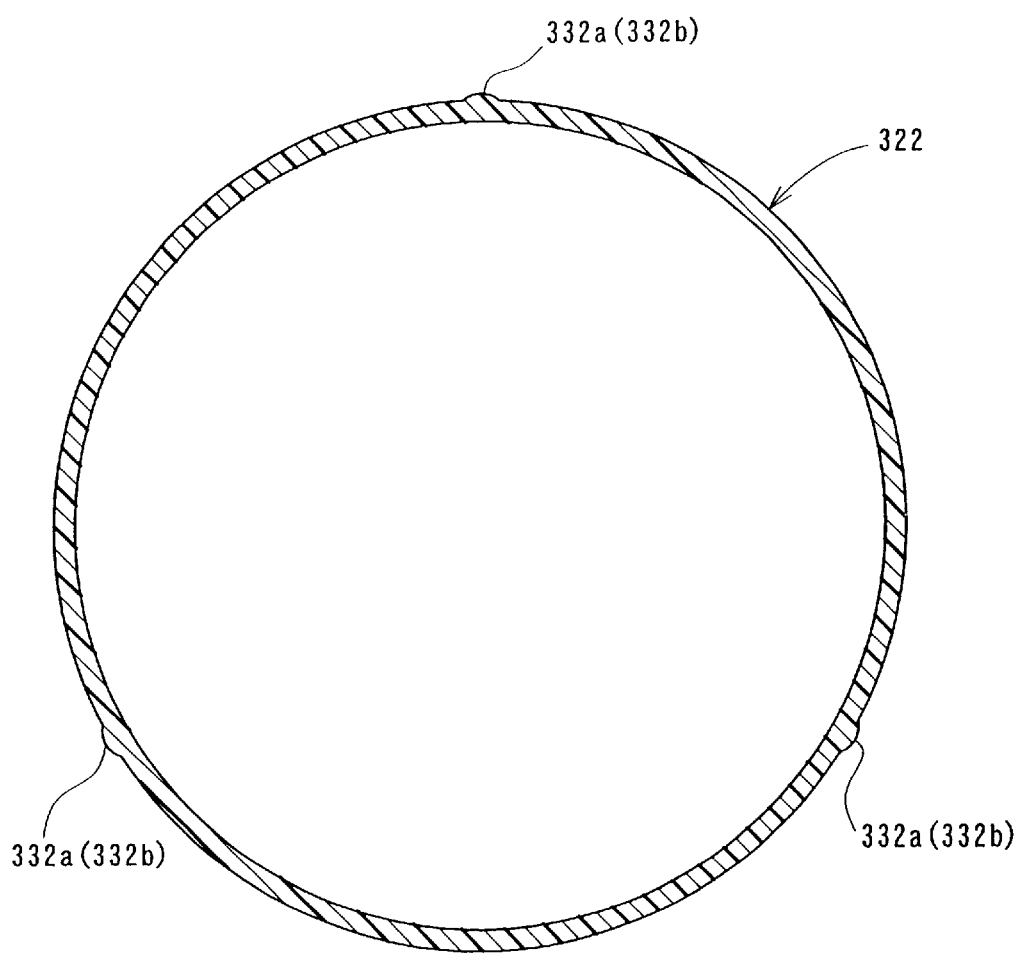
FIG. 34 shows a vertical sectional view illustrating the large diameter annular attachment section as viewed in a direction substantially perpendicular to an axis of a driven shaft.

As shown in FIG. 34, three pairs of first small projections 332a and second small projections 332b as described above are arranged and separated from each other by spacing distances of about 120 degrees in the circumferential direction. However, there is no limitation thereto. It is also preferable that a single set or a plurality of sets of small projections separated from each other by a predetermined angle in the circumferential direction are formed, or they may be constructed to be continuous in the circumferential direction.

Figure 35:
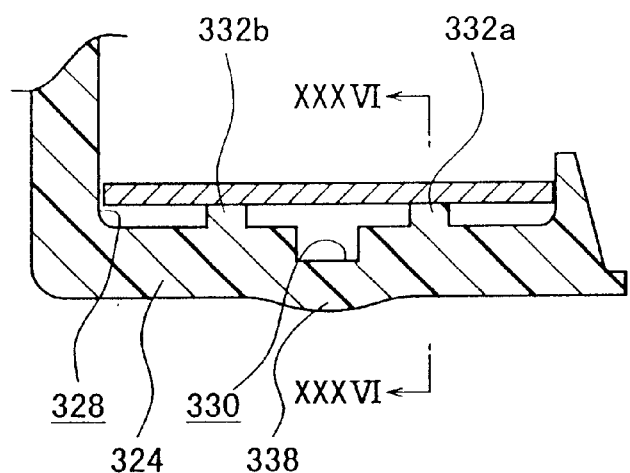
FIG. 35 shows a partial magnified vertical sectional view illustrating a small diameter annular attachment section for constructing the boot made of resin shown in FIG. 29.
Figure 36:
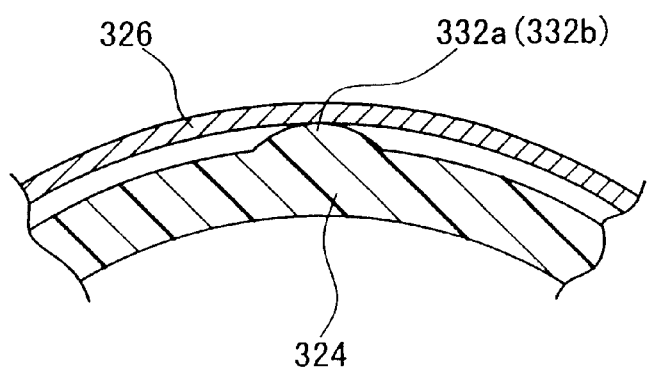
FIG. 36 shows a magnified vertical sectional view taken along a line XXXVI—XXXVI shown in FIG. 35.
Figure 37:
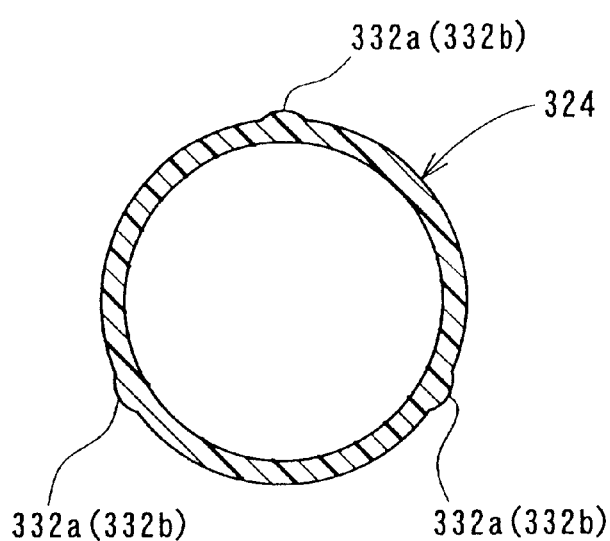
FIG. 37 shows a vertical sectional view illustrating the small diameter annular attachment section as viewed in a direction substantially perpendicular to the axis of the driven shaft.

As shown in FIGS. 35 to 37, the first small projection 332a and the second small projection 332b, which are formed at the band-mounting groove 328 of the small diameter annular attachment section 324, are formed in the same manner as those of the large diameter annular attachment section 322.

In this arrangement, the first small projection 332a and the second small projection 332b, which are separated from each other by the predetermined spacing distance with the annular groove 330 intervening therebetween, are formed respectively. Accordingly, the fixing band 28a, 28b can be stably fixed in the band-mounting groove 328.

A curves surface section 338, which is gently curved, is formed on each of lower surfaces of the large diameter annular attachment section 322 and the small diameter annular attachment section 324. It is designed that when the fixing band 28a, 28b is constricted, the curved surface section 338 is pressed to exhibit the sealing function.

Next, modified embodiments of the small projection to function as the frictional coefficient-increasing mechanism are shown in FIGS. 38 to 42.

Figure 38:
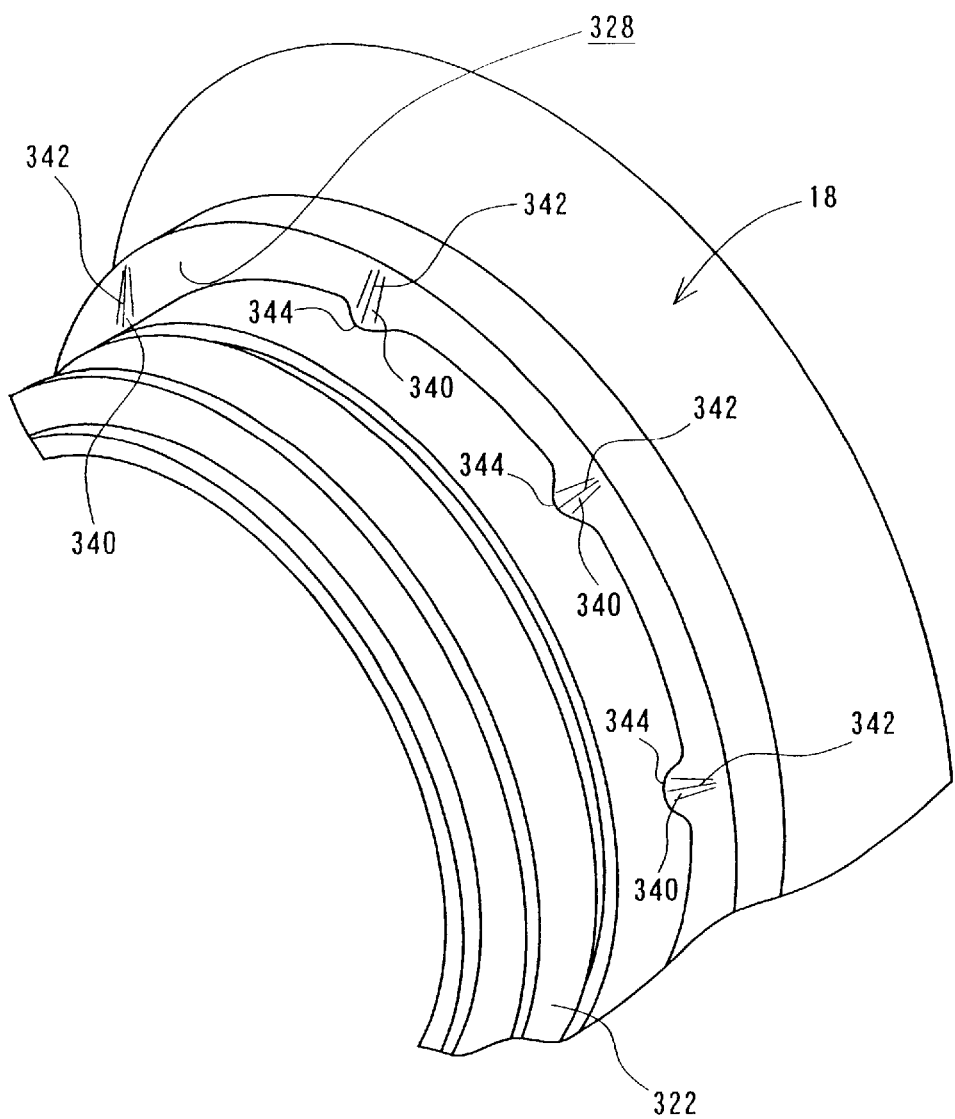
FIG. 38 shows, with partial omission, a perspective view illustrating a first modified embodiment of a small projection formed in a band-mounting groove.
Figure 39:
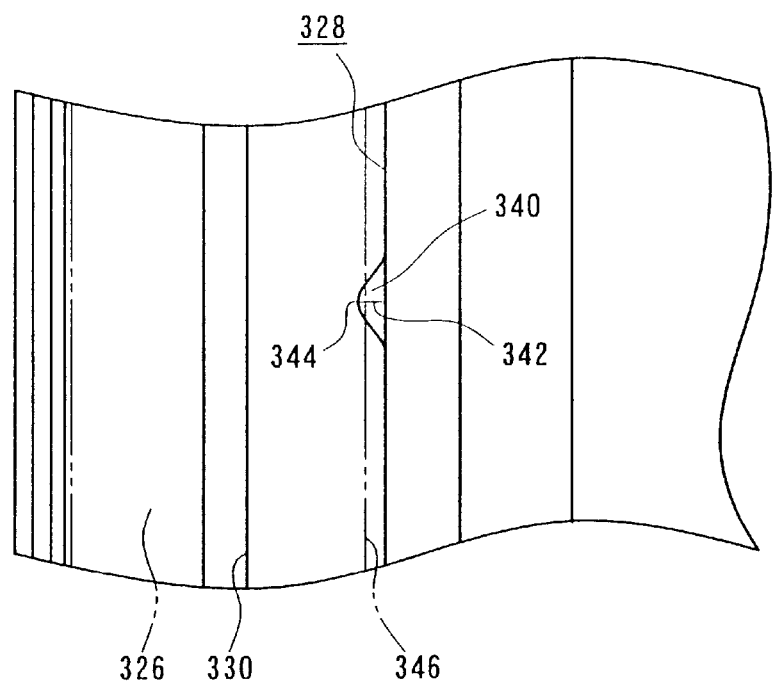
FIG. 39 shows, with partial omission, a plan view illustrating a boot made of resin shown in FIG. 38.
Figure 40:
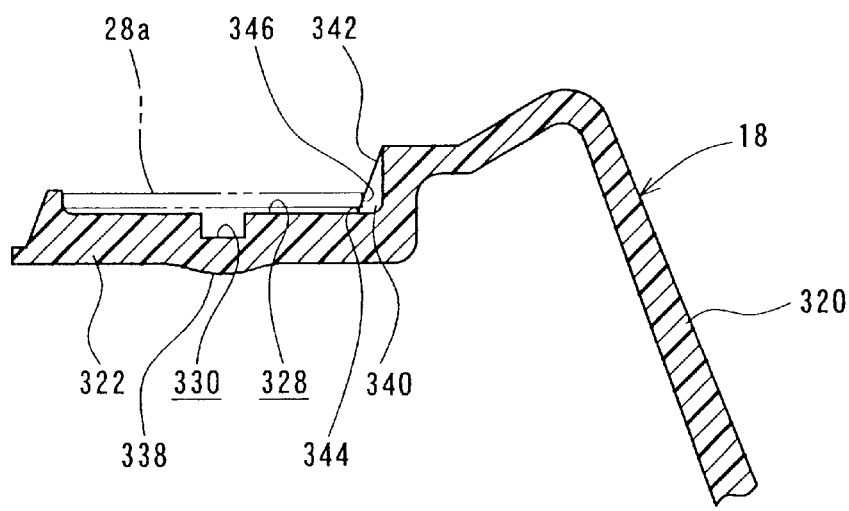
FIG. 40 shows, with partial omission, a vertical sectional view illustrating the boot made of resin shown in FIG. 38.

In a first modified embodiment, a plurality of small projections 340, which are separated from each other by predetermined spacing distances in the circumferential direction, are formed on an inner wall on the side of the bellows section 320 of the band-mounting groove 328 (see FIG. 38). The small projection 340 is formed to have a substantially triangular configuration as viewed from an upper position (see FIG. 39). The small projection 340 is formed with an inclined surface 342 slanting downward to the left from the side of the bellows section 320 toward the fixing band 28a (28b) in a vertical cross-sectional configuration as viewed in the direction substantially perpendicular to the circumferential direction (see FIG. 40).

The small projection 340 has a tapered section 344 which is formed to be gradually tapered toward the opposing other wall surface of the band-mounting groove 328. The tapered section 344 is provided to make engagement with a side surface 346 of the fixing band 28a (28b) in the circumferential direction (see FIG. 40).

Figure 41:
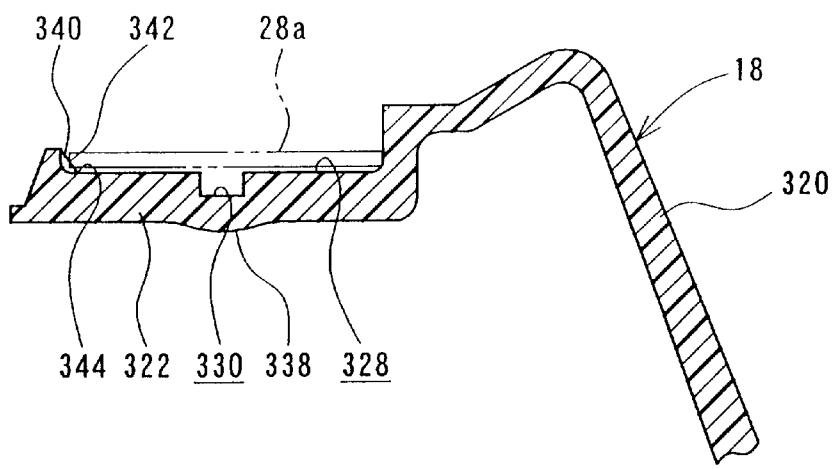
FIG. 41 shows, with partial omission, a vertical sectional view illustrating a state in which a small projection is formed on a side opposite to one shown in FIG. 40.

Alternatively, the plurality of small projections 340, which are separated from each other by the predetermined spacing distances in the circumferential direction, may be formed on the wall surface on the side opposite to the bellows section 320 (see FIG. 41). Further alternatively, the small projection may be formed to be continuous in the circumferential direction on the wall surface on the side of the bellows section 320 of the band-mounting groove 328 or on the wall surface on the side opposite to the side of the bellows section 320.

Figure 42:
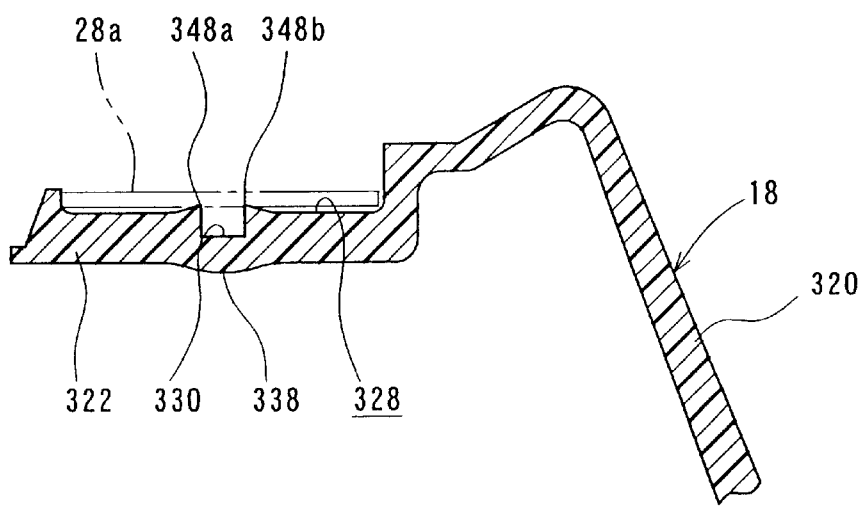
FIG. 42 shows, with partial omission, a vertical sectional view illustrating a second modified embodiment of a small projection formed in a band-mounting groove.
Figure 43:
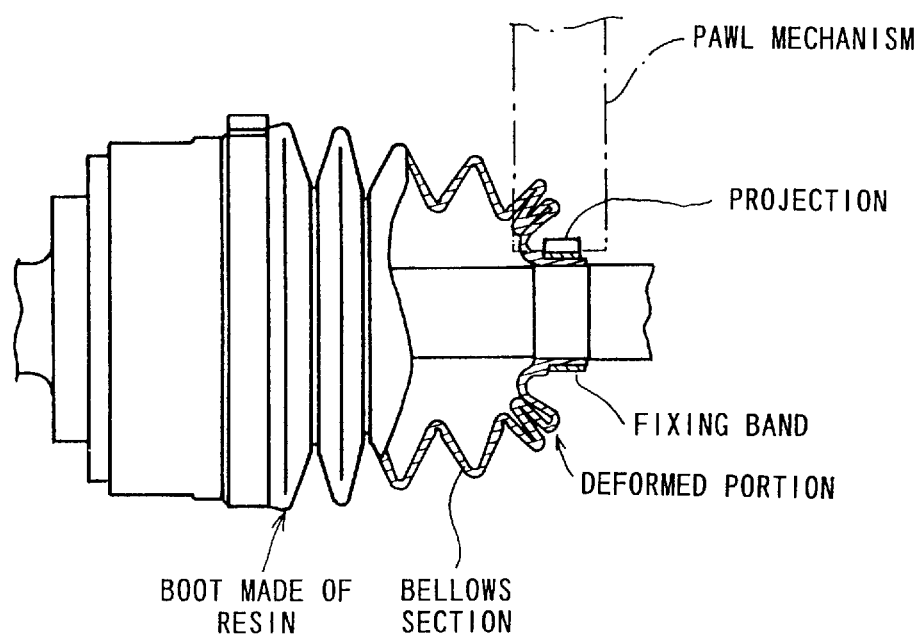
FIG. 43 shows a partial sectional front view illustrating a deformed state of a bellows section of a boot made of resin, which arises when a band-fixing apparatus concerning a conventional technique is used.

In a second modified embodiment, as shown in FIG. 42, a first small projection 348a and a second small projection 348b, which slightly protrude upwardly, are formed on the upper side of an annular groove 330 respectively. Accordingly, the contact surface with respect to the lower surface portion of the fixing band 28a (28b) is decreased to increase the contact surface pressure. Thus, an advantage is obtained such that this arrangement causes less sliding.

The first small projection 348a and the second small projection 348b shown in FIG. 42 may be formed as a plurality of individuals which are intermittently separated from each other by predetermined spacing distances in the circumferential direction respectively, or they may be formed to have a continuous circumscribing configuration in the circumferential direction.

Next, explanation will be specifically made below for the fixing band-tightening method for the boot 18 made of resin for the constant velocity universal joint.

At first, the rotary driving source 24 is driven so that the first constant velocity universal joint 12, the second constant velocity universal joint 14, and the drive shaft 16, which are coaxially held by the first holding mechanism 38 and the second holding mechanism 42, are rotated in an integrated manner respectively. In this process, the fixing band 28a, 28b is loosely fitted to the large diameter annular attachment section 322 of the boot 18 made of resin with a slight clearance. When the boot 18 made of resin is rotated, the fixing band 28a, 28b is also rotated in accordance therewith. Therefore, the projection 30 of the fixing band 28a, 28b is rotated in a predetermined direction about the center of the central axis of the drive shaft 16.

That is, the plurality of first small projections 332a and the plurality of second small projections 332b (or the small projections 340 or the first small projections 348a and the second small projections 348b), which are formed and separated from each other by the predetermined spacing distances on the wall surface in the circumferential direction of the band-mounting groove 328, are engaged with the side surface of the fixing band 28a, 28b in the circumferential direction respectively. Thus, the frictional coefficient is increased.

Therefore, when the fixing band 28a, 28b formed of the metal material is loosely fitted to the boot 18 made of resin with the slight clearance, the frictional coefficient, which is generated between the large diameter annular attachment section 322 and the fixing band 28a, 28b, is increased, for example, by the aid of the plurality of first small projections 332a and the plurality of second small projections 332b formed for the band-mounting groove 328. Accordingly, it is possible to integrally rotate the loosely fitted fixing band 28a, 28b and the boot 18 made of resin in a reliable manner.

Subsequently, the projection 30 of the fixing band 28a, 28b, which is in the rotating state before arrival at the substantially horizontal state, is detected by the first sensor 117 and the second sensor 121 (see FIG. 19). When the first stopper mechanism 82 and the second stopper mechanism 84, which constitute the stopper section 32, are energized, the projection 30 of the fixing band 28a, 28b is positioned in the substantially horizontal state (see FIG. 20).

In this process, even in the state in which the projection 30 is positioned at the predetermined position by the aid of the stopper block 118, the boot 18 made of resin and the drive shaft 16 are in the rotating state in accordance with the driving action of the rotary driving source 24, owing to the clearance between the boot 18 made of resin and the fixing band 28a, 28b.

In the state in which the projection 30 of the fixing band 28a, 28b is positioned in the substantially horizontal direction, the first tightening mechanism 124, which constitutes the band-tightening section 34, is displaced to hold the projection 30 by the aid of the holding section 186. After that, the stopper block 118 is moved upwardly to separate it from the projection 30. Further, the rotary driving source 24 is deenergized to stop the rotation of the boot 18 made of resin and the drive shaft 16.

Further, the first tightening mechanism 124 is energized, and the fixing band 28a, 28b is tightened in accordance with the forcible nipping action by the pair of pawls 172a, 172b in the state in which the projection 30 is held by the holding section 186. Thus, the tightening operation for the fixing band 28a, 28b is completed.

In the fixing band-tightening method for the boot 18 made of resin for the constant velocity universal joint, when the projection 30 of the fixing band 28a, 28b is forcibly nipped in the state in which the boot 18 made of resin and the fixing band 28a, 28b are integrally rotated in accordance with the driving action of the rotary driving source 24, the frictional coefficient, which is generated between the boot 18 made of resin and the fixing band 28a, 28b formed of the metal material, can be increased by providing the first small projections 332a and the second small projections 332b for making engagement with the outer surface of the fixing band 28a, 28b on the wall surface of the band-mounting groove 328.

In other words, the friction is actively generated between the fixing band 28a, 28b and the band-mounting groove 328 to which the fixing band 28a, 28b is installed. Accordingly, when the tightening operation for the fixing band 28a, 28b is performed, the boot 18 made of resin and the fixing band 28a, 28b are rotated and moved reliably respectively.

Therefore, the boot 18 made of resin and the fixing band 28a, 28b can be reliably engaged with each other. Further, the projection 30, which is positioned in the substantially horizontal direction in the state in which the both are rotated in the integrated manner, can be forcibly nipped to constrict the fixing band 28a, 28b.

As a result, the operation for tightening the fixing band 28a, 28b by the fixing band-tightening apparatus 10 can be automated smoothly and efficiently. The constricting position, at which the fixing band 28a, 28b is tightened, can be stabilized at the predetermined position. An advantage is obtained such that the commercial property concerning the appearance is improved.

For example, even when a minute amount of lubricating oil adheres to the large diameter annular attachment section 322 and/or the small diameter annular attachment section 324 of the boot 18 made of resin or to the fixing band 28a, 28b, the frictional coefficient, which is generated between the fixing band 28a, 28b and the boot 18 made of resin, is increased to be less slippery. Thus, it is possible to avoid the loose rotation of the fixing band 28a, 28b with respect to the boot 18 made of resin.

Further, owing to the function of the self-weight of the projection 30 of the fixing band 28a, 28b made of metal, it is possible to avoid the loose rotation of the fixing band 28a, 28b.

What is claimed is:

1. A constant velocity universal joint apparatus comprising:

a drive shaft;

a tripod type constant velocity universal joint connected to a first end of said drive shaft;

a boot made of rubber and covering said tripod type constant velocity universal joint;

a steel belt having an overlapped portion, wherein said steel belt is irradiated with a laser beam to effect welding and fusion so that said steel belt is fixed to said boot made of rubber;

a bar field type constant velocity universal joint connected to a second end of said drive shaft;

a boot made of synthetic resin and covering said bar field type constant velocity universal joint; and a fixing band having a projection, wherein said projection is forcibly nipped so that said fixing band is fixed to said boot made of synthetic resin.

* * * * *